INVENTOR
WILLIAM S. WESTERMANN
BY
ATTORNEY

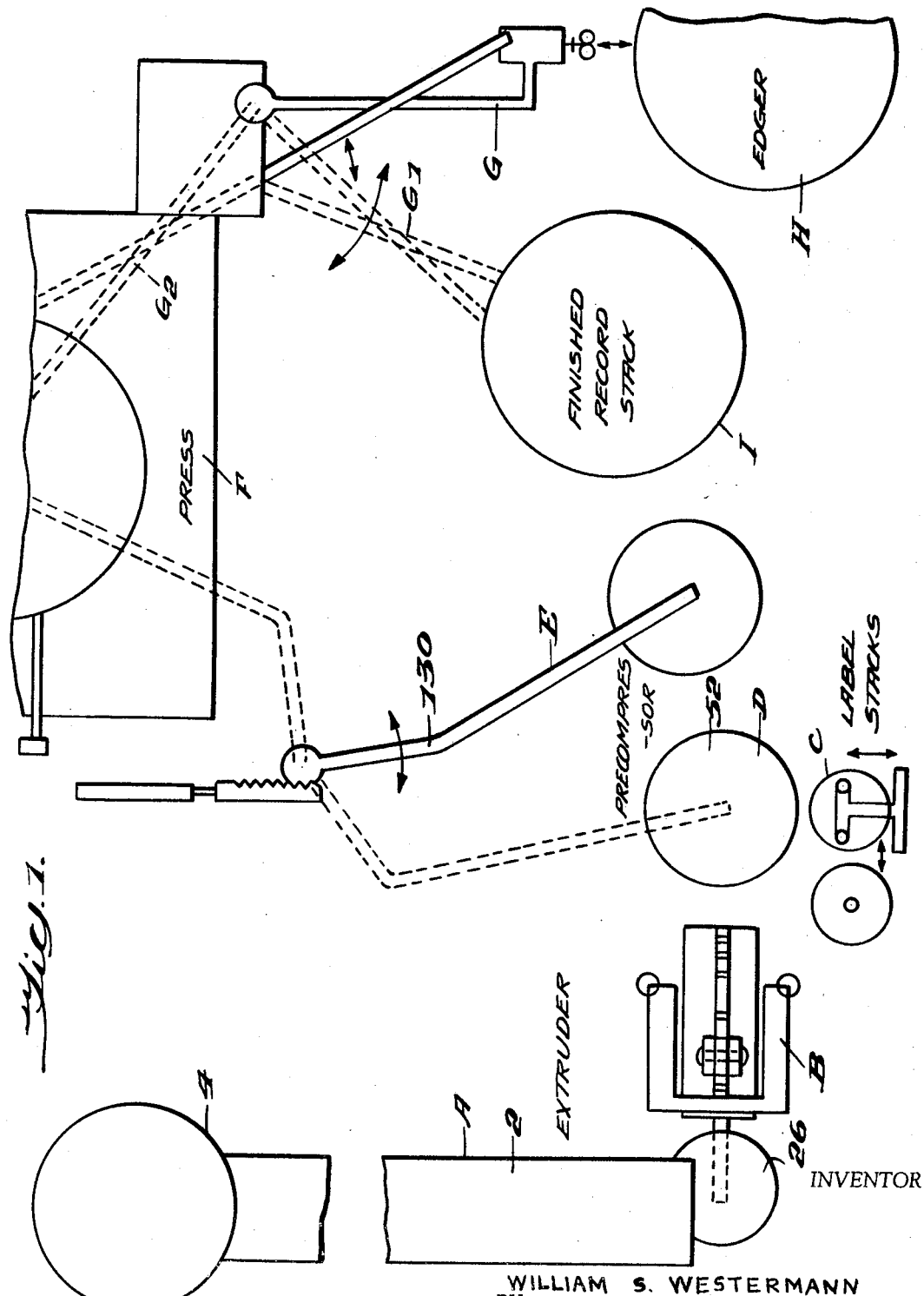

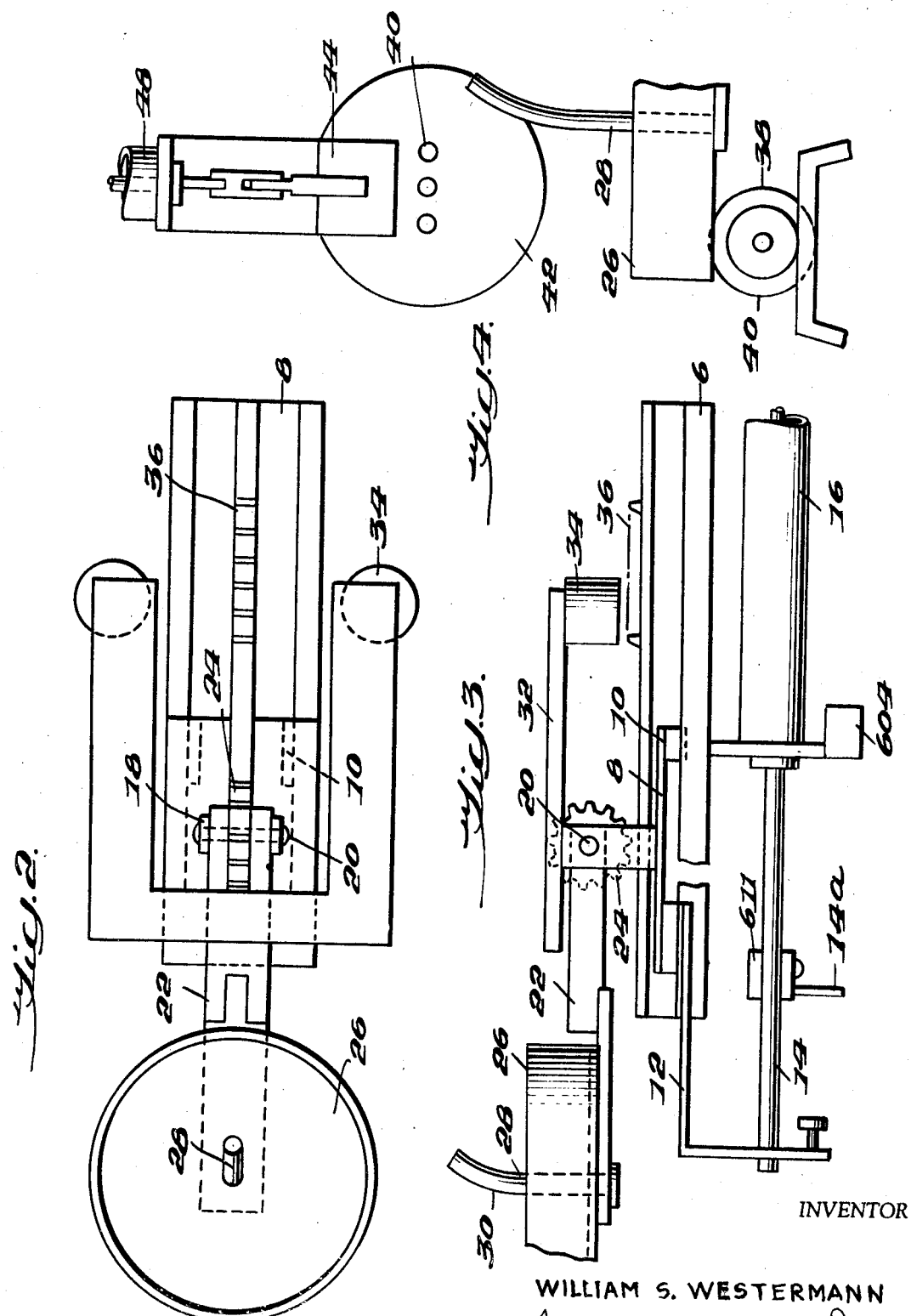

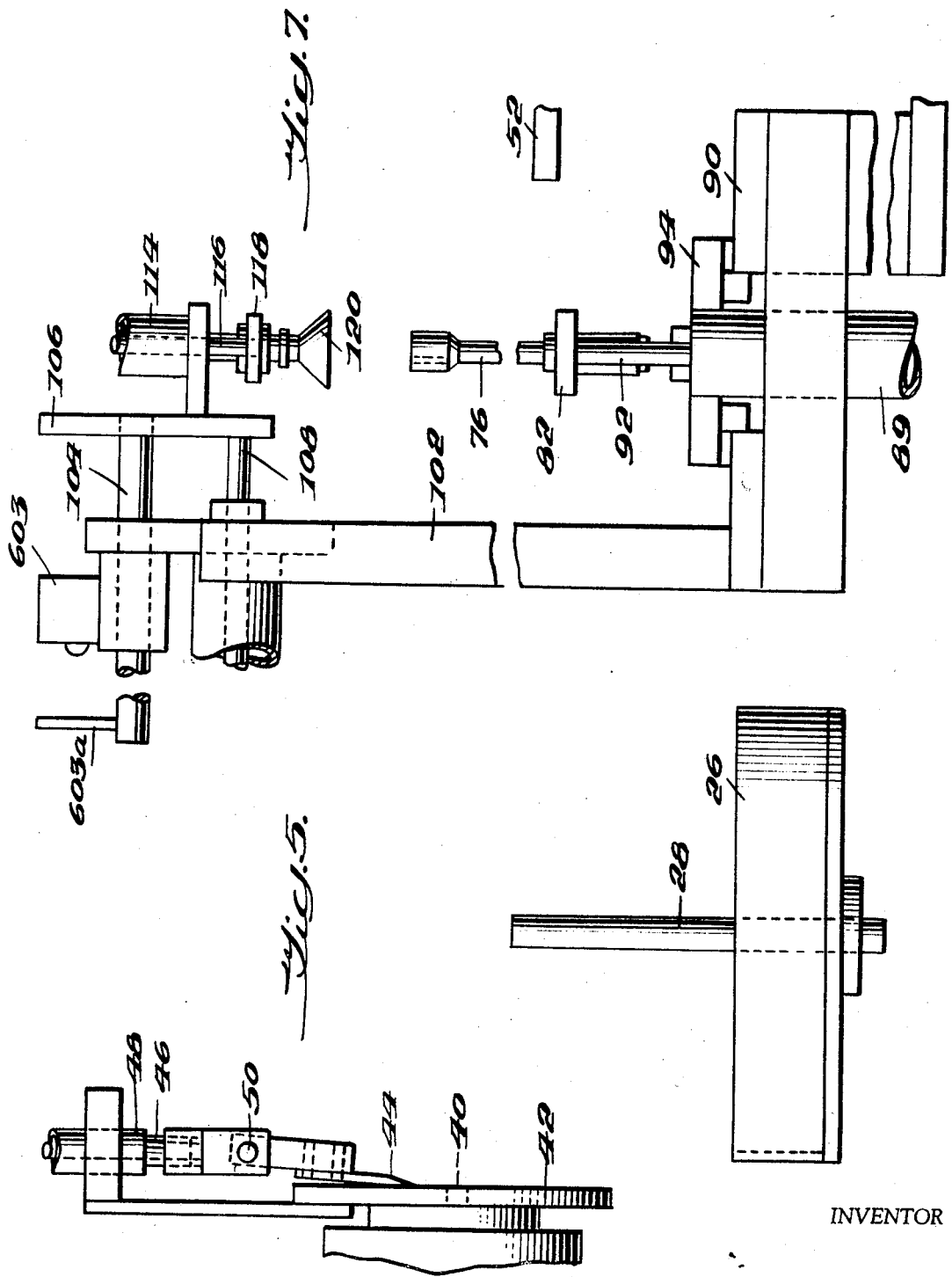

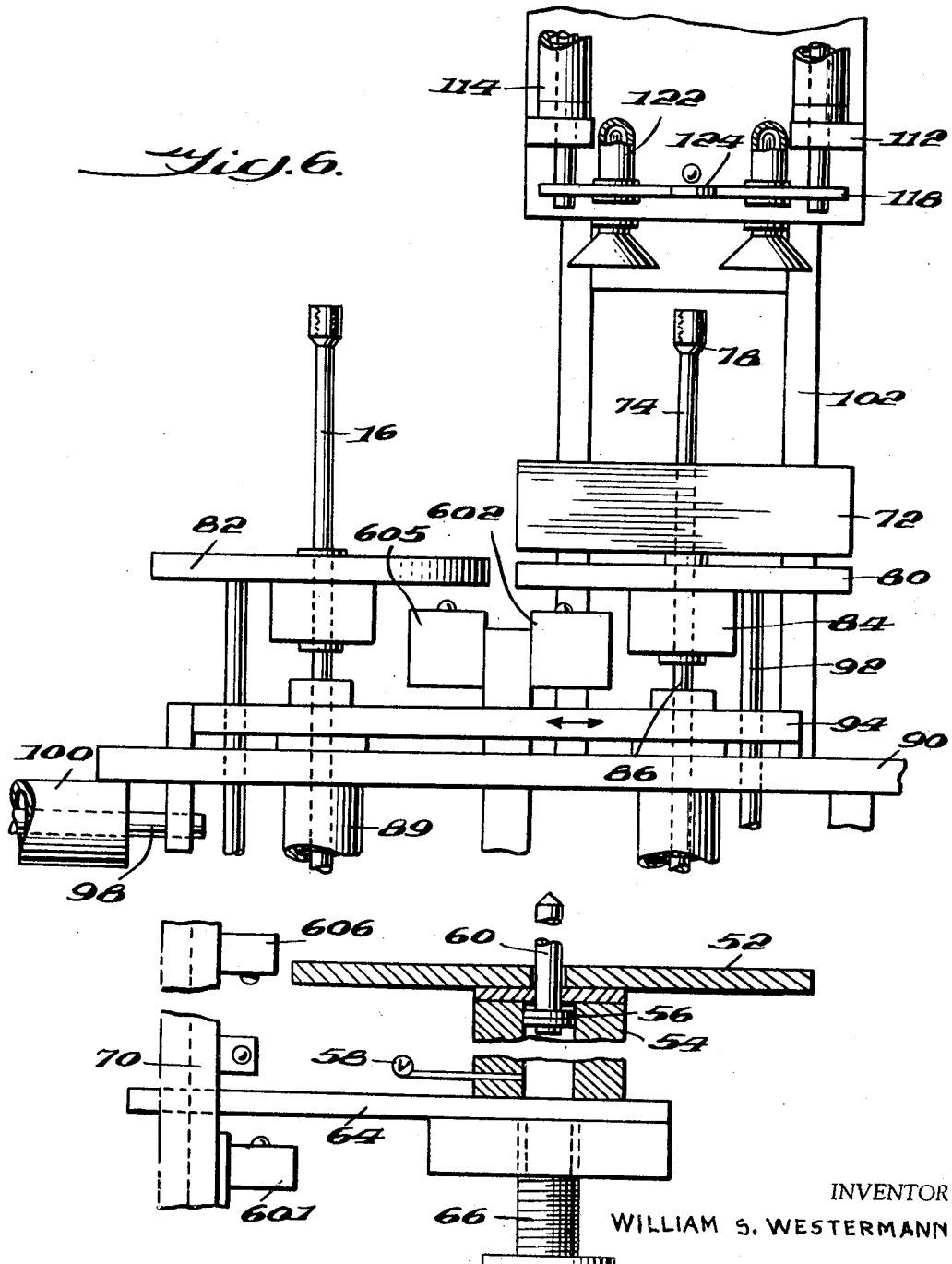

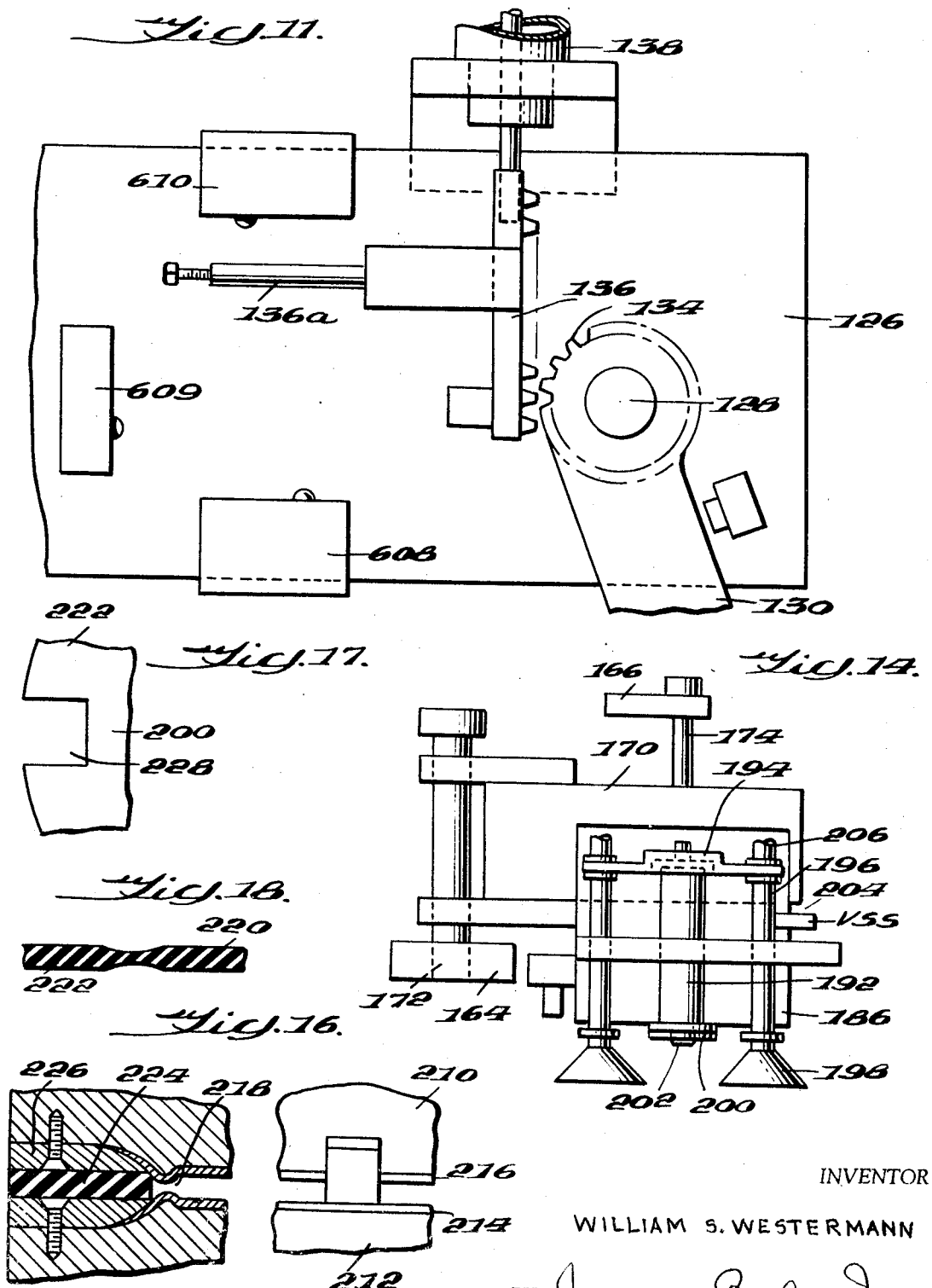

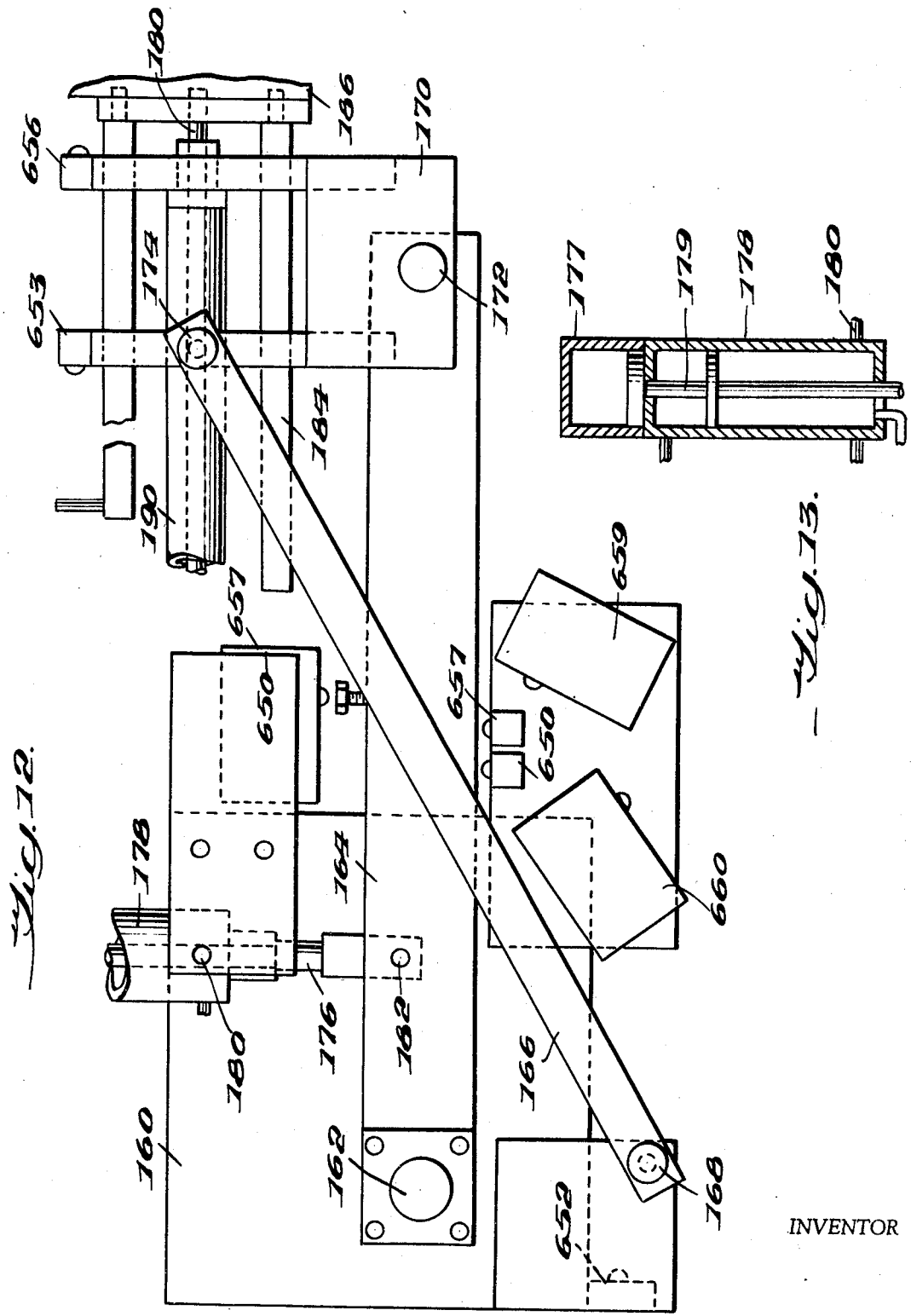

INVENTOR
WILLIAM S. WESTERMAN

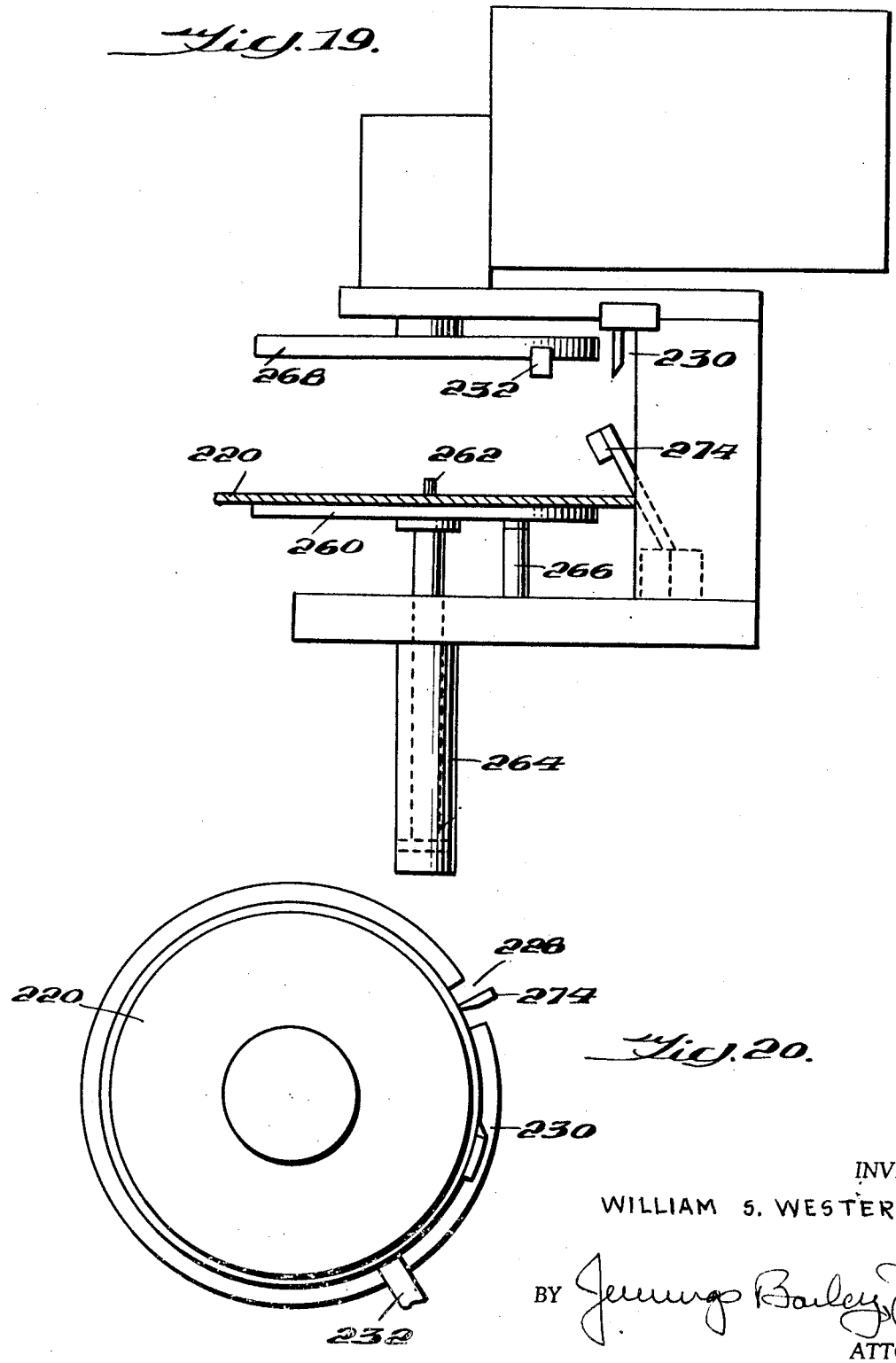

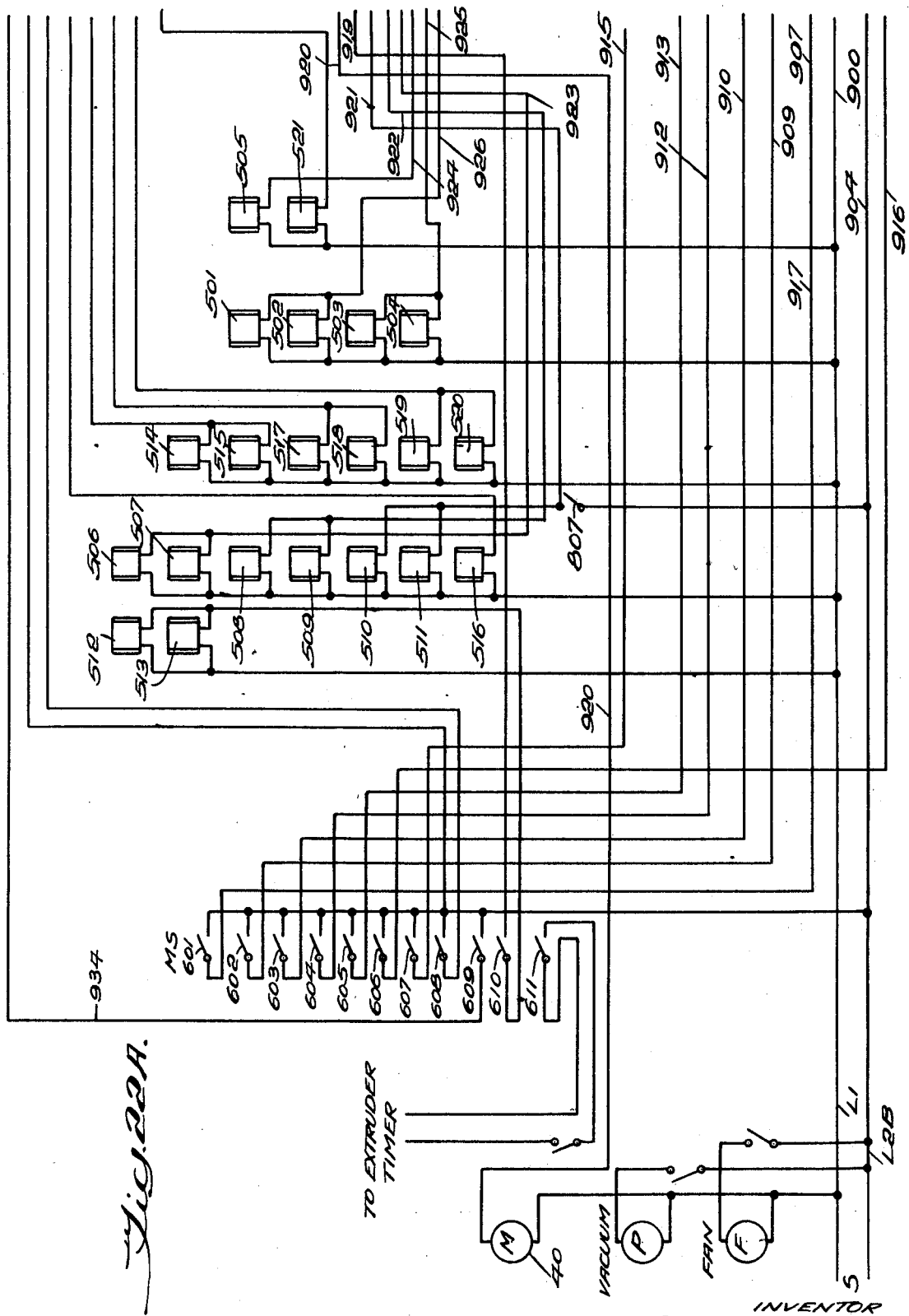

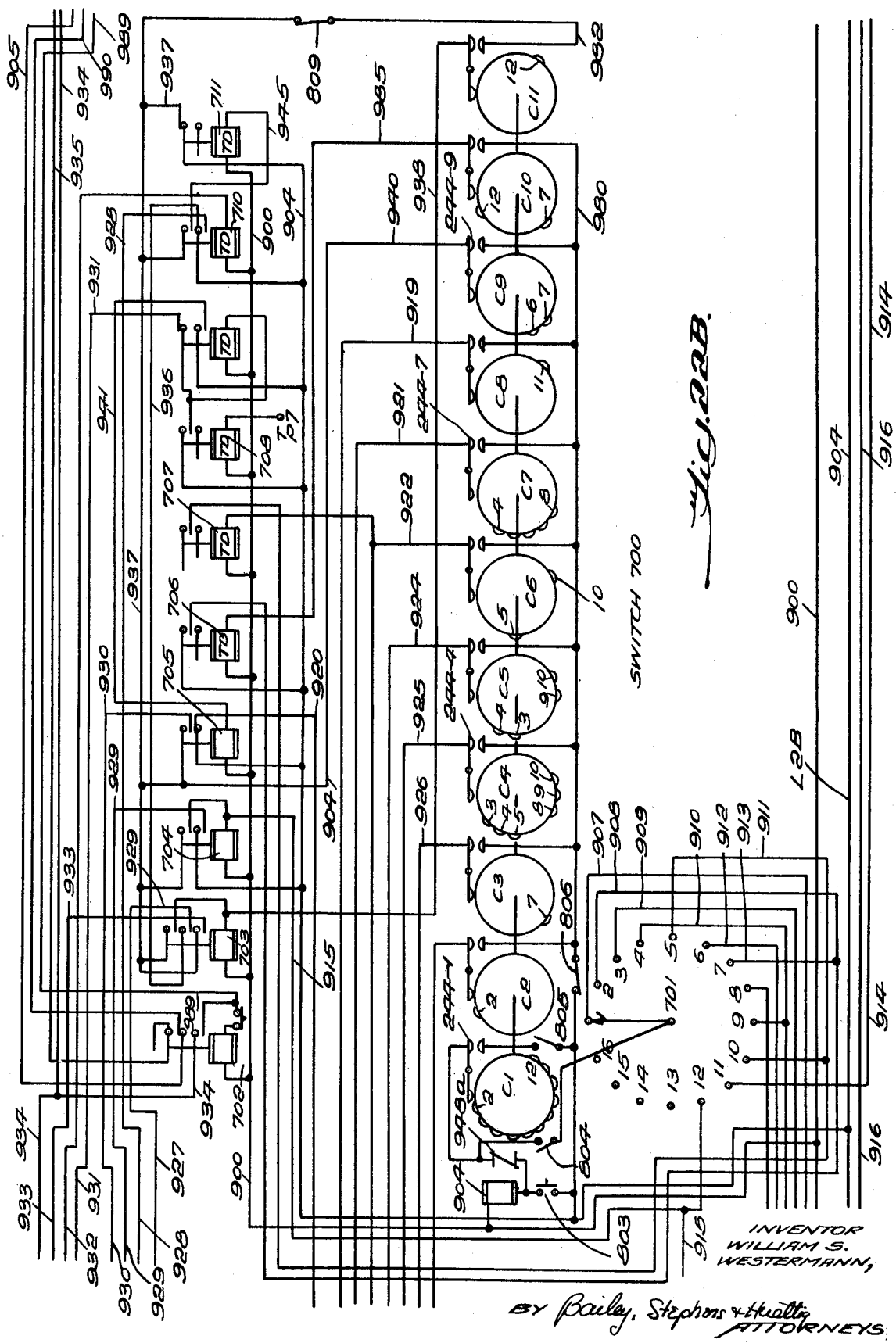

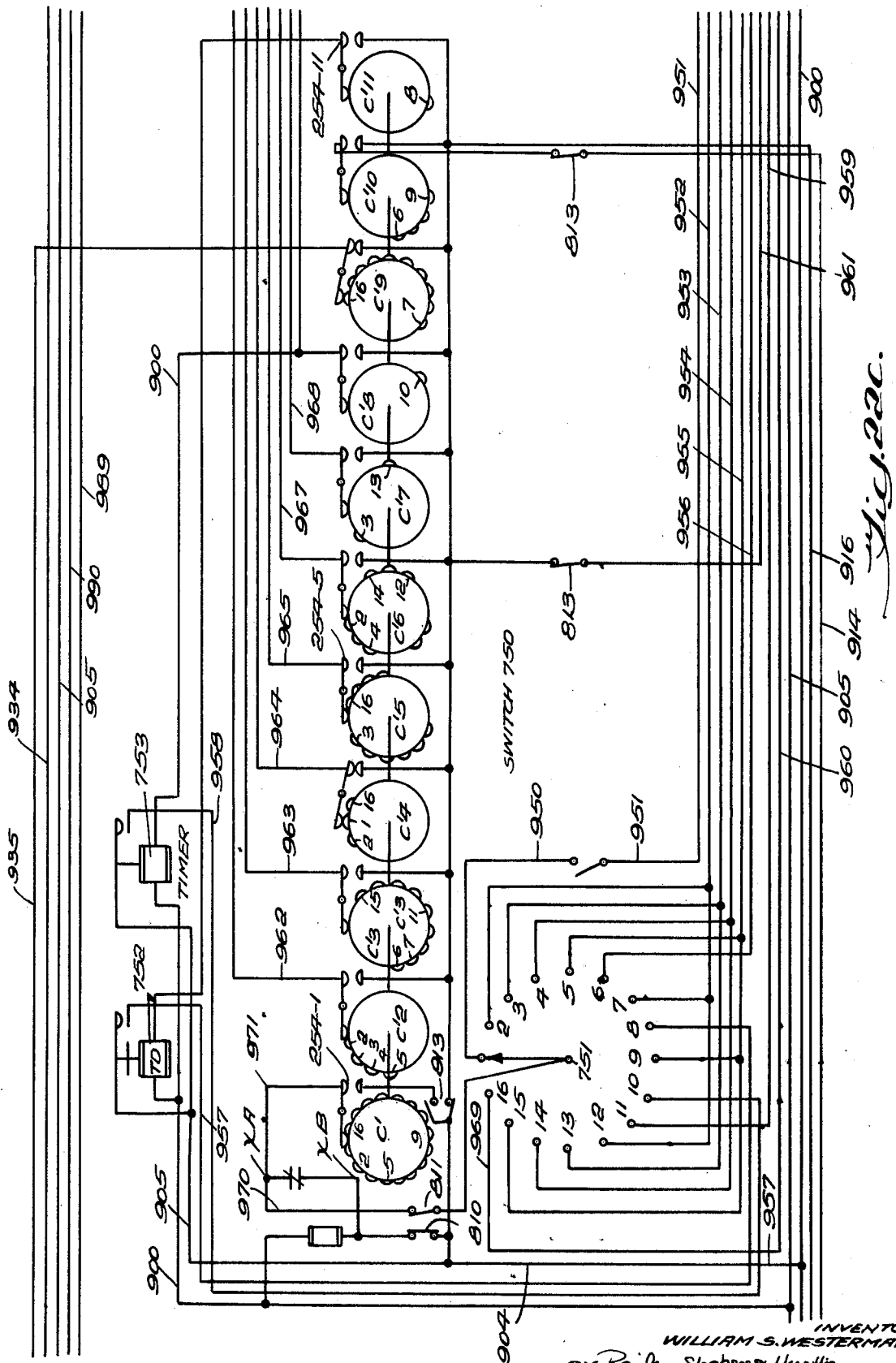

United States Patent Office 3,514,813
Patented June 2, 1970

3,514,813
MACHINE FOR MAKING PHONOGRAPH
RECORDS
William S. Westermann, Nashville, Tenn., assignor to
D.D.W., Inc., Nashville, Tenn.
Filed July 8, 1966, Ser. No. 563,877
Int. Cl. B29d 17/00
U.S. Cl. 18—5.3                                    20 Claims

ABSTRACT OF THE DISCLOSURE

A machine for making phonograph records has a rotatable cup which is movable to a position beneath an extruder which extrudes plastic material eccentrically into the cup while the cup rotates to form an annular body. This cup is mounted on a carriage which is moved away from the extruder and which, at the furthest point from the extruder, is inverted and deposits the annular body around a pin on a receiving plate. Prior to the deposit of the annular body, a label is placed face down over the pin. After the receiving plate receives the annular body, another label is placed face up on top of the annular body. A single label feeding mechanism is used, two label holding mechanisms being moved successively beneath the label feeding mecahnism. After the sandwich is completed, the receiving plate is raised and places the sandwich against a downwardly directed surface having a central pin thereon to compress the sandwich partly. The receiving plate is then lowered, and the downwardly facing plate is swung between the two dies of a press, where the sandwich is discharged from the plate. The record is then pressed between two dies. It is then picked up from the press and carried to an edger which removes the flashing and rounds off the edge of the record. The finished record is then transferred to a finished record stack.

---

Machines have been heretofore known for producing phonograph records automatically, but so far as I am aware, these have all been of such a complicated nature that they were either too expensive or were impractical and unsatisfactory in operation.

The primary object of the present invention is to provide a machine for making phonograph records automatically which is of simple construction, when considering the various functions which must be performed, and which is, therefore, less likely to get out of order and less expensive to construct and operate.

The invention, in general, includes a mechanism for extruding plastic while simultaneously forming it into mass of annular shape, forming a sandwich using this annular piece of plastic between two labels, pre-compressing the sandwich, transferring the partly compressed sandwich to a record press, compressing the sandwich in the press to form the record with the groove on each face surrounding the labels, and with a flashing extending from the record, removing the record from the press, trimming the flashing and finishing the edge of the record, and thereafter placing the finished record on a stack.

Among the important features of the invention are the extrusion of the plastic which is heated to a sufficient degree to be fluent into a rotating cup at a point spaced from the center of the cup, so that the plastic forms an annular body in the cup, the proper amount being regulated by cutting off the flow when a sufficient amount has been placed into the cup.

According to a further feature of the invention, there is provided a label-holding mechanism which holds two stacks of labels, with means for removing a label from one stack and placing it on a compression plate of a pre-compression mechanism, after which the annular body of plastic is placed on the plate, and the label stacks are moved and the mechanism places a second label on top of the annular body of plastic from the second stack of labels. This sandwich is then partially compressed by upward movement of the compression plate against a transfer plate, after which the transfer plate takes over the sandwich from the compression plate and moves it to the record press, which is of conventional form, however, with certain improvements which will be described hereinafter.

One such improvement includes an arrangement for facilitating the removal of the record from the press by engagement with the flash as the press opens.

The invention further contemplates a transfer mechanism for picking up a record from the press, after the press is opened, removing it to an edger, and, after the edger has done its work, transferring the record to a finished record stack.

A further feature of the invention consists of the provision of a small piece of rubber or other compressible material between the two dies of the record press, at the part where the flashing normally escapes from between the dies, for the purpose of creating a break in the flashing, for facilitating the operation of the edger, as will be hereinafter described.

Further objects and advantages of the invention will appear more fully from the following descriptions, particularly when taken in conjunction with the accompanying drawings, which form a part thereof.

In the drawings:

FIG. 1 shows schematically in top view the arrangement of a machine according to the invention.

FIG. 2 shows in top plan view the mechanism for holding the cup which receives the plastic from the extruder and transferring the annulus of plastic in the cup to the compression plate;

FIG. 3 is a side elevation of the mechanism of FIG. 2, with parts broken away;

FIG. 4 is an end view of the extruder showing the cup and the cup-turning mechanism;

FIG. 5 is a side view of the extruder nozzle showing the plastic cut-off mechanism;

FIG. 6 shows in front elevation the label-handling mechanism;

FIG. 7 is a side view of the same mechanism;

FIG. 8 shows principally in section the precompression plate and its mounting;

FIG. 11 shows in top plan view the mounting and actuating mechanism for the transfer arm;

FIG. 12 shows the mounting and actuating mechanism of the unloading arm;

FIG. 13 shows in cross-section the double cylinder of FIG. 12;

FIG. 14 is a front-end view of the record-holding mechanism of the unloading arm;

FIG. 16 shows the manner in which a break is provided in the flash;

FIG. 17 shows in plan view a part of the edge portion of the record as it leaves the press;

FIG. 18 shows in cross-section the edge portion of the record;

FIG. 19 shows the edging mechanism in side elevation;

FIG. 20 is a top plan view thereof;

FIGS. 22A to 22D are a wiring diagram;

Figure 9:
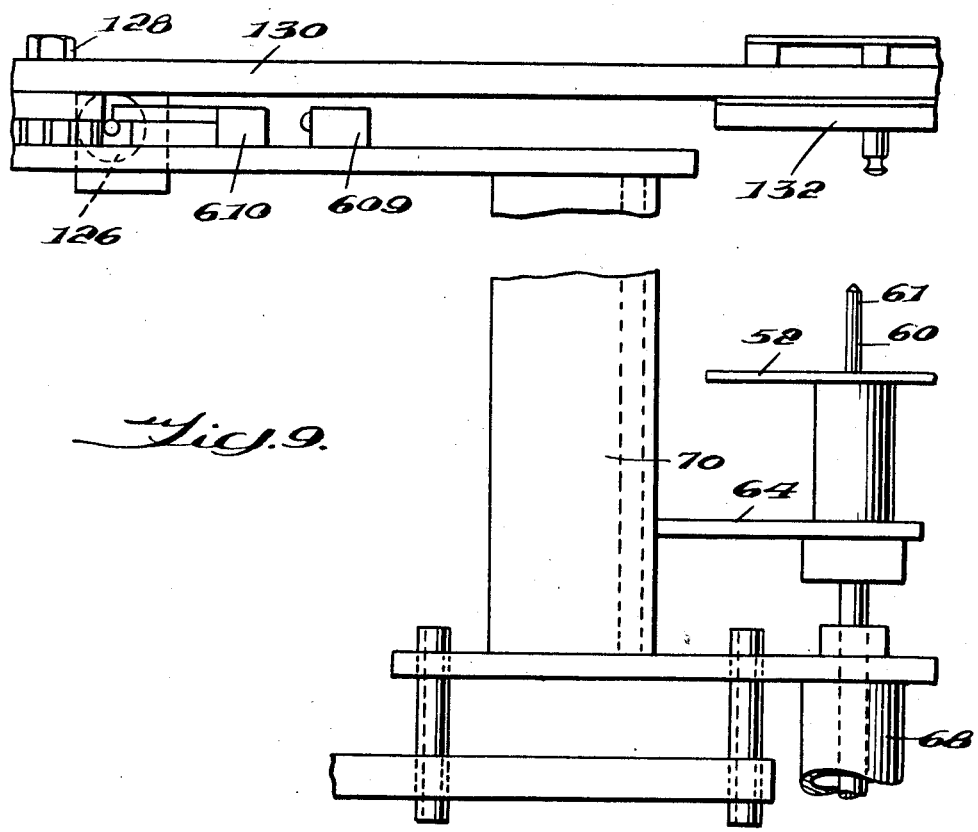
FIG. 9 shows in side elevation, with parts broken away, the pre-compression plate and the transfer arm.

In FIG. 1, the extruding mechanism is indicated at A; the mechanism for receiving and transferring the annular plastic mass at B; the label-handling mechanism at C; the pre-compression mechanism at D; the transfer arm at E; the press at F; the unloading mechanism at G; the edger at H; and the finished record stack at I.

Referring now to FIGS. 2 to 5, the extruder includes a tubular body 2 receiving plastic from a hopper 4. Mechanism is provided for heating and cooling the portion 2 of the extruder, so that the plastic may be maintained in the proper condition of fluency. The extruder is of the screw-operated type.

The mechanism for receiving the extruded plastic and transferring it to the pre-compression plate is shown in FIGS. 2 to 5. It includes a machine frame having rails 6 between which a carriage 8 is guided, by means of downward extension 10. The carriage 8 has a forwardly projecting portion 12, which is connected to the piston rod 14 of a piston slidable in a pneumatic cylinder 16. The carriage 8 has upward projections 18 in which a shaft 20 is turnably mounted. Shaft 20 carries a part 22 having forked arms mounted on shaft 20 between which is a gear 24 rigid with the arms. A cup 26 is rotatably mounted on the end of arm 22, to turn around a stationary pin 28 having a bent upper end portion 30. Likewise secured to the arm 22 are rearward projections 32 carrying counterweights 34.

On of the machine frame, and within the path of movement of the gear 24 is a rack 36 which is, however, of limited length, as is shown in FIG. 3, and does not engage the pinion 24 during the whole path of movement of the carriage 8.

Arranged in a position to engage the bottom of the cup 26, when it reaches the position shown in FIG. 3, is a rubber or other suitable roller 38 driven by a fixed motor 40. This motor runs whenever the cup 26 has advanced into a position to engage with the roller.

The extruder has, as is clear from FIG. 4, its central axis eccentric to the axis of the pin 28 around which the cup 26 rotates. The extruder has a face plate 42 with three holes 40 arranged on the same horizontal line.

Associated with the face plate 42 of the extruder is a cut-off mechanism comprising a knife 44 mounted to slide up and down over the face of the extruder and across the holes 40, being moved by connections from a piston rod 46 of a cylinder 48. A spring arrangement is provided for tending to turn the knife around the axis 50, for the purpose of holding it against the face of the plate.

In FIG. 8, there is shown the pre-compression plate 52. This plate is mounted on the top of a cylinder 54, in which a piston 56 is slidable. The interior of the cylinder can be furnished with air under pressure through a pipe 58. The piston 56 has a pin 60 extending upwardly through the plate 52 and slidable therein, this pin then being held upwardly in a resilient manner by the pressure of the air beneath the piston 56.

The cylinder 54 is mounted on a plate 64, which, in turn, is carried by the piston rod 66 or a piston slidable in the hydraulic cylinder 68. The end of the plate 64 remote from the piston 54 is guided in a vertical guide 70, in order to prevent rotating of the plate 52.

The mechanism heretofore described operates in the following manner:

Fluid under pressure is furnished to the cylinder 16 in order to push the piston rod 14 outwardly or towards the left in FIGS. 2 and 3. This carries with it the carriage 8, and the cup 26 is then positioned in the manner shown in FIG. 4 beneath the outlet openings 40 of the extruder; the outlet openings, however, are eccentric with respect to the axis of rotation of the cup 26. The extruder is now operated, in order to extrude the amount of plastic required for a record. When this has been done, the knife 44 is actuated to cut off the plastic and the feed of plastic is electrically stopped. Meanwhile, cup 26 has engaged rubber wheel 38 and is rotated so that the plastic is laid in an annular or doughnut-shaped body on the bottom of the cup.

Now fluid is supplied to the other side of the piston in the cylinder 16 in order to shift the carriage 8 inwardly or towards the right in FIGS. 2 and 3. During the first portion of such movement, the cup 26 moves out from beneath the extruder 42. When the gear 24 engages the rack 36, the arm 22 with the cup 26 and the counterweight 34 is rotated (clockwise in FIG. 3) and the curved end 30 of the pin 28 engages the end of pin 60 and pushes the pin down into the cylinder 54, allowing the plastic to fall from cup 26, onto plate 52 and around pin 60.

Meanwhile, by the mechanism to be described in the succeeding section, a label has been laid face down on the plate 52 with its hole over the pin 60. Thus, the doughnut-shaped body of fluent plastic is laid on top of the record label.

The label-feeding mechanism is shown in FIGS. 6 and 7.

There are two labels, one for the top and one for the bottom of the record. The labels, as indicated for example at 72, are arranged in stacks on two pins 74, 76. Each of these pins has at its top an enlarged head 78, the diameter of which is very slightly larger than the diameter of the hole in the label, and which has a roughened surface, for example, provided by the machining of a fine thread on the outside of a nipple threaded on the upper end of the spindle. The purpose of this is to prevent any label other than the single one engaged by the suction mechanism, to be described hereinafter, from coming off the pin when the top label on the stack is lifted.

The labels are stacked in a dry condition, with the labels all having the grain of the paper running in the same direction so as to reduce the danger of warping of the record.

The pins 74 and 76 are extensions of the piston rods of cylinders 88 and 90. Rectangular tables 80, 82 are carried by blocks 84 mounted on piston rods 86 by means of snap rings. The tables have downwardly extending rods 92 which pass through holes in a carrier 94 so as to be guided therein, to prevent rotation of the tables 80, 82. Carrier 94 also carries cylinder 88.

Carrier 94 is mounted for sliding movement in the direction indicated by the arrow 96 and is guided in such movement in the frame 90. This carriage can be moved in the direction of the arrow 96 by a piston rod 98 connected to a piston slidable in a pneumatic cylinder 100. The frame of the machine includes an upwardly extending member 102, in which is horizontally slidable a rod 104 connected to a plate 106 which is also connected to a piston rod 108 of a piston slidable in the pneumatic cylinder 110. This plate has forward projection 112 on which are mounted pneumatic cylinders 114. The piston rods 116 of these pneumatic cylinders support a transverse bar 118. The transverse bar 118 carries below it suction cups 120, which are positioned on opposite sides of an upward continuation of the stem 74. These are connected by pipes 122 to a source of suction, the connection for example being accomplished by flexible tubes.

The transverse member 118 has a hole 124 therein above the head 78 of the stem 74, so that the stem can pass upwardly through the transverse member.

This mechanism operates in the following manner:

Before, or while, the plastic is being extruded into the cup 26, the parts are in the positions shown in FIGS. 6 and 7. The pneumatic cylinder 88 is now furnished with air under pressure and lifts the table 80 until the label stack 72 comes up against the suction cups 120. The suction in the pipes 22 will then be turned on and will hold the top label and the air fluid pressure is released from the bottom end of cylinder 88, and introduced into the top end so that the table 80 descends. The cylinder 110 is then furnished with fluid under pressure, and advances the plate 106 until the suction cups 120 are located on both sides of a continuation of the pin 60 of the plate 52. The hydraulic cylinders 114 are now relieved of pressure, while pressure is supplied on the upper side of the pistons, and the cross-bar 118 descends and pushes the label over the pin 60 which is larger in diameter than the hole in the label. Suction on the cups 120 is now released, and cylinders 114 are energized to raise cross-piece 118. Cylinder 110 is then retracted to the position of FIG. 7.

Meanwhile, cylinder 100 has been actuated, and has moved the carriage 94 to the right until the table 82 occupies the position shown in FIG. 6 by the table 80, directly beneath the suction cups 120. Meanwhile, the carriage 8 has been retracted and the cup 26 inverted over the plate 52 to deposit the doughnut-shaped body of fluent plastic thereon, on top of the label. The mechanism of FIGS. 6 and 7 is then operated to take a label from the second stack and place it on top of the annular body of plastic material. The label handling mechanism is then restored to its initial position.

Figure 10:
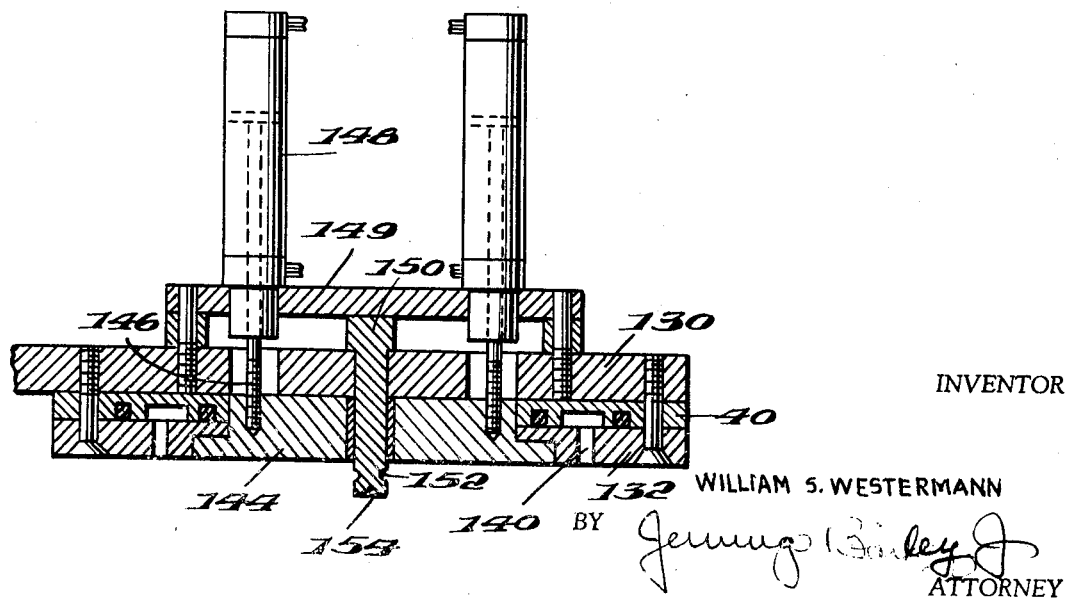
FIG. 10 shows in cross-section the transfer plate carried by the transfer arm.
Figure 15:
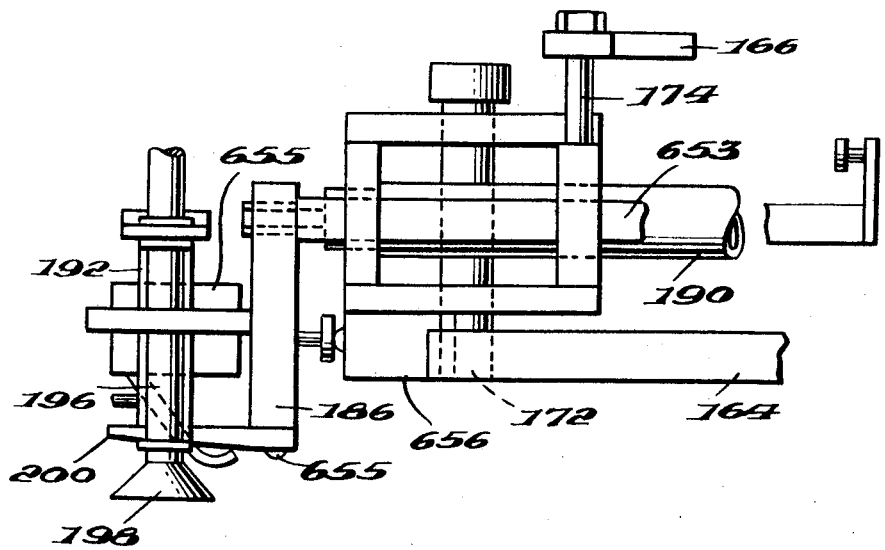
FIG. 15 is a side elevation of the record-holding mechanism.

Referring now to FIGS. 8 to 10, plate 52 is carried by a hollow post 54 within which slides a piston 56 carrying pin 60. Fluid under pressure can be supplied to the interior of post 54 by pipe 58. Pipe 58 is mounted on a plate 64 which is movable by the piston rod 66 of a cylinder 88 and has one end guided by a vertical frame 70.

Mounted on top of the frame 70 is a plate 126 on which is pivoted at 128 an arm 130. This arm carries on its under side the transfer plate 132. Arm 130 has an annular rack portion 134 concentric with pivot 128. This is engaged by a rack 136 which is activated by the piston rod of a piston in cylinder 138.

Transfer plate 132 (see FIG. 10) has holes 140 arranged in a circle in its lower face connected by suitable passages to a source of suction. These passages are in an outer ring 40 rigid with plate 132. Within this ring is a movable disc portion 144 connected by rods 146 to the pistons of cylinders 148 carried by the plate 149 mounted on top of arm 130. Plate 149 has a pin 150 extending down through an opening in disc 144, and having near its lower end a groove 152 and a reentrant conical opening 154.

With the plate 132 positioned directly over plate 52, cylinder 68 is energized and raises plate 52, carrying the sandwich, until it engages the under side of transfer plate 132. The conical upper point 61 of pin 60 engages in the opening 154 in pin 150, and pin 60 is pressed down against the pressure of the air in the interior of post 54. The plastic material, when the sandwich is pressed against the plate 132, is compressed substantially, although only to about three times its final desired thickness. This results in the entry of a little plastic into groove 152, which helps to hold the sandwich on the bottom face of plate 132.

During this stage of the procedure, the pistons in the cylinders 148 are retracted and suction is supplied to openings 140. Piston 68 is retracted to lower plate 52, leaving the sandwich to be held by plate 132. Fluid under pressure is now furnished to the piston 138, which results in swinging the arm 130 from the first broken line position in FIG. 1 to the second broken line position extending upwardly to the right. This then carries carrier plate 132 between the two plates of the press F. The press F is, in general, of the conventional tilting-head type, in which the bottom plate is retracted, and the top plate is mounted for swinging movement completely out of the path of the material being put in the press.

With the press in the open position, the arm 130 is swung to press-loading position. The supply of suction to openings 140 is cut off, and the hydraulic cylinders 148 are energized to push the member 144 downwardly, so as to push the partly compressed sandwich off the pin 150. The sandwich is forced onto a pin on the lower plate of the press, which is, as has been stated, of a conventional type, aside from two features which are to be described hereinafter.

The sandwich of plastic material between the two labels having been laid on the bottom die which is held in the bottom plate of the press, the top plate carrying the top die is now swung back above the bottom plate and the bottom plate is raised to compress the sandwich between the two plates and to form the grooves on the record. The record is then heated to set the plastic and thereafter cooled.

The mechanism for removing the finished record and trimming it is shown in FIGS. 12–15. It includes a bracket 160 rigid with the frame of the press, on which is pivoted at 162 a lever 164. A link 166 is pivoted at 168 on the same frame. This link in its position crosses over the lever 164 at an angle thereto.

A carrier 170 is pivoted at 172 on the free end of lever 164 and is pivoted at 174 to the link 166.

A piston rod 176 of a pneumatic cylinder 178, pivoted at 180 on the frame 160, is pivoted at 182 to the lever 164, so as to swing this lever between the various positions shown in FIG. 1 when the cylinder is supplied with air under pressure.

At the end of cylinder 178 remote from the lever 164 is a second cylinder 177 having a piston rod 179 sliding into cylinder 178 back of its piston and engageable with but not connected to this piston.

Rods 184 slidably mounted in the carrier 170 carry a frame member 186. This frame member is connected to the piston rod 188 of an air pressure cylinder 190 carried by the carriage 170, which is thus capable of moving the frame 196 towards and from the carriage.

The piston rod of a cylinder 192 mounted on the frame member 190 carries a crosspiece 194 which supports two pipes 196, at the lower ends of which are positioned suction cups 198. Between these suction cups the frame 190 has a forward projection 200, the lower surface of which is cut at a slight angle to the horizontal. In the center of this is a small projection 202 which can fit into the hole in the center of the finished record.

On one of the pipes 196 is a vacuum-sensitive switch 204, capable of being operated when the vacuum is created in the pipes, this taking place only when the cups 198 are in contact with the record. The pipes are connected by flexible tubes 206 to a suitable source of vacuum.

This mechanism operates as follows:

Starting from the intermediate position G–1 shown in broken lines in FIG. 1, in which the frame member 190 has just deposited a record on the finished record stack I, and the suction has been broken to the pipes 196. The cylinder 192 is protracted in this position and the suction cups 198 are raised.

The cylinder 190 is in the retracted position. The cylinder 178 is then energized and swings the arm 164 clockwise in FIG. 1 to the broken line position G–2. In this position, cylinder 190 is protracted to extend frame 186. The cylinder 192 is retracted to lower the pipes 196, so that the suction cups 198 engage a finished record within the press. Suction is supplied to pipes 196 at the time cylinder 192 is retracted so that they hold the record by suction. Cylinder 192 is then protracted to raise the crosspiece 194 and the pipes 196, until the record comes into engagement with the member 200, with its hole over the pin 202. The lower surface of the member 200 is slanted so that the record will be held at a slight slant, which is helpful in preventing interference with its movement as it leaves the press and as it is successively fed to the edger and the finished record stack. Cylinder 190 is retracted. The cylinder 178 is then operated in the opposite direction and swings the arm 164 to the solid line position shown in FIG. 1. The cylinder 190 is now energized, and advances the frame member 186 until the record carried thereby overlies the edger H. Suction to the pipes 196 is now cut off, and the record drops onto the edger disc. Cylinder 190 is now retracted. The edger is now operated to remove the edge from the record and finish it in a manner which will be described hereinafter.

When the edging is finished cylinder 190 is protracted and cylinder 192 is again operated to move the suction cups 198 downward and suction is supplied to the pipes 196. The cups 198 are then lifted by cylinder 192, picking the record off the edger. Cylinder 190 is then energized in the opposite direction to retract the frame 186. Cylinder 177 is then operated to move the arm 164 to the broken line position G–1, so that the record overlies the finished record holder I. The suction is then released from the pipes 196 and the finished record drops on the record stack.

FIG. 16 shows the manner of producing a gap in the flashing of the record as it is pressed in the press. In this figure, there are shown upper and lower disc plates 210 and 212, upon which are placed the dies 214 and 216. In the operation of this press, there is sufficient plastic furnished to the press to form a substantial flashing around the periphery of the finished portion of the record, that is, beyond the point indicated at 218 in FIG. 16. In FIG. 17 there is represented a record having a grooved portion 220 and a flashing 222.

In the edging of such a pressed record, to remove the flashing, difficulty sometimes arises because flashing comes off in a continuous annular strip, which is difficult to dispose of. According to the present invention, there is provided at one point around the periphery of the upper press plate 210, and secured thereto, a block 224 of rubber or other resilient material. This block overlies the ring 226 by which the stamper 216 is secured to the die plate 210. As a result of the insertion of this block between the two holding rings, the finished record will have a notch 228 (FIG. 17) in the flashing outside the grooved portion 220.

The unedged record is placed on edger plate 260 (FIGS. 19 and 20) and around pin 262 which extends upward from plate 260. Plate 260, supported on the piston rod of cylinder 264, is free to rotate about its axis except when it is retracted and in contact with brake 266 (FIG. 19). Cylinder 264 is then protracted causing plate 260 to move upward and force the record against the rotating plate 268. In its travel upward, the record flash is pierced at its thinnest point by fixed knife 230. This point is indicated at line 8, FIG. 16. When the record comes in contact with plate 268, it is caused to rotate (in the direction shown in FIG. 19) thus, knife 230 if unassisted, would merely cut an annular shaped piece of plastic from the periphery of the record. However, shortly after rotation of the record has begun, finish cut tool 232 is caused, by means of an air cylinder (not shown), to move against the edge of the record, producing a rounded edge as shown at C (FIG. 16). The plastic removed by the finish cut tool is not annular since the tool has cut through the removed material during its travel to the finish cut position.

After sufficient rotation of the record, cylinder 264 retracts and plate 260 comes in contact with brake 266, causing the plate to stop rotating.

The means of removing the annular ring of flash will now be explained. As was described, a rubber block (FIG. 16) between the stamper hold-down rings produces a gap in the flash. The depth of the gap (from the periphery of the record and flash toward the center of the record) extends only to the line A (FIG. 16). Thus, if knife 230 were unassisted in removing the flash, an annular shape would still result as the flash is still held in the shape of a ring by the material between lines A and B (B indicates the location of the cut produced by knife 230).

When the record is placed on the edger on plate 260, the gap 228 is so located that when plate 260 rises, knife 274 (so positioned that its blade is directed toward the center of the record) slices (as at 276) through the material between lines A and B (FIG. 17) and slightly into the area between B and C. Thus, when that part of the record in which the cut produced by knife 274 has rotated as far as knife 230, the flash cut by knife 230 merely peels off from the periphery and falls into a container.

The reason for keeping the plate 260 from rotating in the retracted position (by means of brake 266) is that, in the placement of the record on the plate, it is sometimes contacted by the flash and caused to rotate. Thus, the gap produced by the rubber block might not be positioned in line with knife 274.

Figure 24:
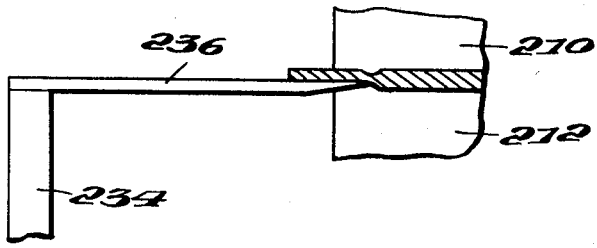
FIG. 24 shows the arrangement for facilitating the removal of a record from the press.
Figure 21:
FIG. 21 is a side view of the finish tool.
Figure 23:
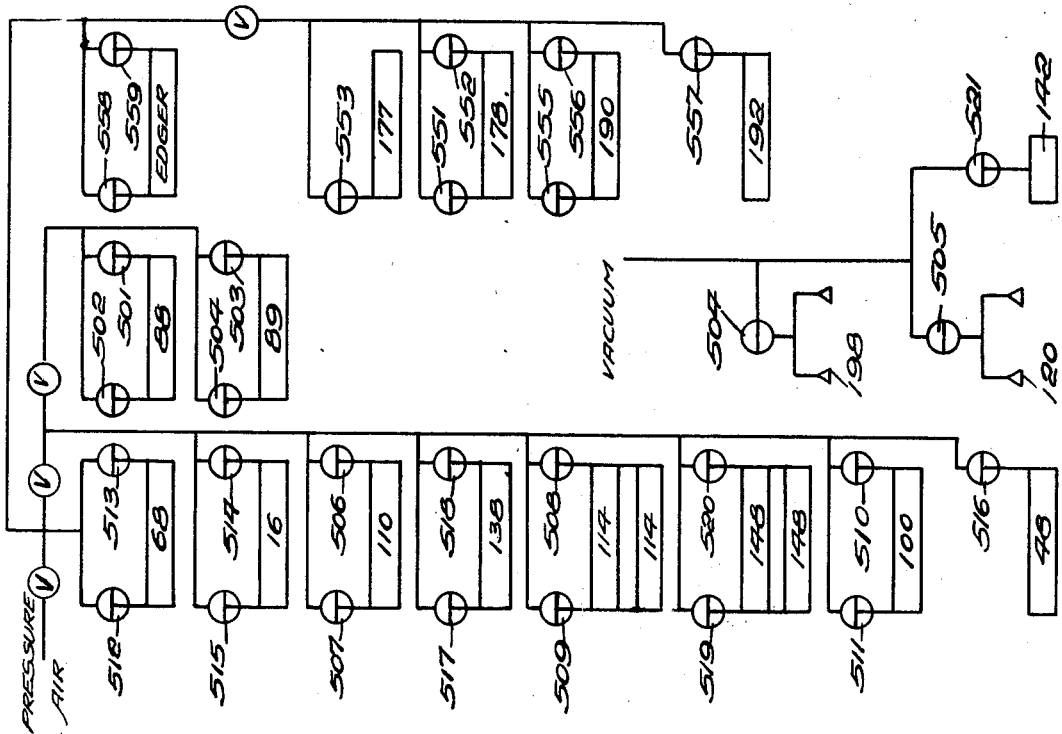
FIG. 23 is a diagram of the pneumatic connections.

Referring now to FIG. 24, the press plates 210 and 212 are indicated in the position which they occupy before the plate 212 is raised to compress the record against the plate 210. The frame of the machine carries a support 234, from which extends inwardly towards the press plates a resilient bar 236, the end of which is tapered upwardly. This bar will be pressed by the raising of the lower press plate against the edge of the lower press plate, and when the flashing is extruded from between the two dies, a certain amount of the flashing will pass between the tapered free end of the member 236 and the plate 210. Thus, when the bottom plate 212 is lowered, the resiliency of the bar 236 will tend to separate the finished record from the bottom stamper 212, so that air will be allowed to pass between the record and the lower stamper. Thus the record can be removed from the press by the suction cups.

Figure 22D:
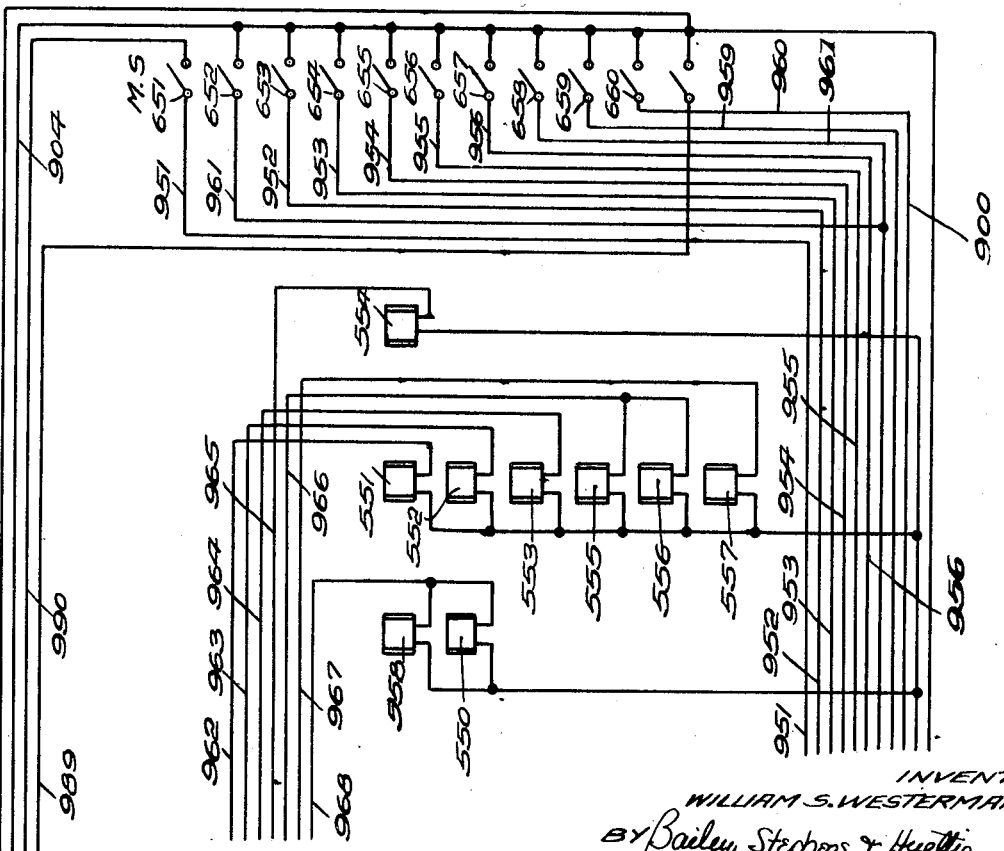

Referring now to FIGS. 22–A to 22–D, the mechanism includes two step switches, indicated at 700 and 750.

The step switch is a device which utilizes a solenoid and weight assembly to cause rotation of a series of cams (as C1 to C11) which independently open and close a set of contacts. What is termed a "stepping contact" 948a is connected in series with the solenoids. The function of the "stepping contact" is to break the circuit to the solenoid circuit broken until the weight has descended and caused the cams to rotate through one position.

The various cams of each step switch are constituted by discs having projections therefrom. These projections such as 240 engage a projection 242 on an arm 243, which, when it is swung clockwise, causes engagement of a pair of electrical contacts 244. The contacts 244 are normally open, except in the case of disc C'9.

The resetting of the step switch to cause the switch to advance continuously from one step to another is achieved by utilizing the first cam in each step switch in conjunction with the "stepping contact" and a toggle switch (806 on switch 700, 813 on switch 750), so that automatic stepping to a predetermined position can be achieved. The "stepping contact" operates as described above. After the weight drops, the next impulse is allowed to pass from the power line (904 in switch 700, 905 in switch 750) through the contacts 244 of cam C1 finally through the "stepping contact" and into the solenoid. When the toggle switch 813 is closed, and one of the cams is positioned so as to close the circuit, the step switch will advance one position. Step switch 700 is so programmed that automatic self-stepping can be achieved until the switch has advanced to position 1. It should be noted that, when the reset is being achieved, the power line to the valves controlled by the step switch is interrupted at the second pole of reset switch 806, thus eliminating air cylinder activity during reset.

Attached by gears to the common shaft of the discs C1 to C11 or C′1 to C′11 is a movable contact of a tap switch 701 (751).

The purpose of this switch is to break an impulse from a device on the machine used to supply the impulse to advance the step switch through one position (such as a micro-switch). The reason for this is that some micro-switches remain closed through more than one position of the step switch. If the circuit from that micro-switch were not broken, the step switch would continue to advance as long as the micro-switch is closed. The tap switch, however, which advances with the step switch, breaks the circuit from the impulse triggering device during the step switch advance caused by that impulse.

Relays 702 and 703 and 704, 705 are normally closed and open only when the coil is energized.

Relays 706 to 711 are time delay relays which have a non-adjustable time delay feature causing the contacts to change from the normally-closed position to the normally-open position ¼ to ½ second after energization of the coil. The contacts will remain in the normally-open position as long as the coil is energized.

Timer 753 is a solid state timing circuit with an adjustable delay feature. On the closing of a circuit the device will begin timing, and, depending on the dial setting, when that time has elapsed, a set of contacts inside the timer will close.

Valves 501 through 521 and 551 through 559 are 3-way solenoid actuated air valves, piped either normally-open to an air cylinder port, or normally-closed to an air cylinder port. Each valve has a built-in orifice adjustment on pressure and exhaust.

The operation of the circuit shown in FIGS. 22–A to 22–D will now be described, and it is believed that the circuitry will be clear from the description.

As used herein in connection with the operation of pneumatic cylinders, the word "protract" means to extend the piston rod from the cylinder.

The relays are shown with their controlled contacts in the normal positions, that is, the positions they occupy when the solenoid is deenergized.

As several machine activities are taking place simultaneously, it seems expedient to begin with the functions which begin to take place when the plate 64 (FIG. 8) is retracting.

Plate 64 (FIG. 8) retracts and switch 601 (FIG. 8) is closed. This causes step switch 700 to advance one position, to position 2, which causes contacts 244–2 (switch 700) to close and contacts 244–10 (switch 700) to close. Closing of contacts 244–2 causes energization of valves 501 and 502 which control the cylinder 88 (FIG. 6). Valve 501 is connected to rod port of cylinder 88 (rod port meaning the port at the end of cylinder from which the rod extends) closes (meaning closing off from line pressure and venting the cylinder port to atmosphere) while valve 502 (connected to the rear port) (rear port being on the end opposite from the rod end) opens (meaning opening the cylinder port to line pressure and closing that port to atmosphere) causing cylinder 88 to protract. This causes plate 80, on which labels are stacked, around the extended rod portion 74 of cylinder rod 86, to move upward until the label stack contacts suction cups 120 (FIGS. 6 and 7). Closing of contacts 244–10 causes energization of time delay relay 706 (a ½ second time delay relay). On the closing of the contacts or relay 706 (½ second after energization of the coil) a current is passed through the C1, N.O. contact of relay 706, through wire 908, to contact 2 on tap switch 701, through the wiper 701a, through wire 946, to toggle switch 804 (closed for automatic operation), through wire 948, through the "stepping contact" (948a), through wire 947, and into the coil up step switch 700 causing the switch 700 to advance to position 3 (½ second after having advanced to position 2). It should be noted that cams C2 and C3 of switch 700 have no lugs in position 3, thus valves 501 and 502 are de-energized which will cause cylinder 88 to retract, and thus, the coil of relay 706 is de-energized which will allow the relay to change to the normally closed position, allowing the relay to reset.

A2

In position 3 of switch 700, the lug on cam C4 has caused contacts 244–4 to close which causes energization of valve 505, connected between line vacuum and suction cups 120 (FIGS. 6 and 7), which opens allowing vacuum to be created in the suction cups which hold the label.

A3

Cylinder 88 (FIG. 6) retracts causing plate 80 (FIGS. 6 and 7) to retract which closes micro-switch 602 (FIG. 6) which allows a current to pass through tap switch 701, contact 3 and into the solenoid of switch 700, causing switch 700 to advance to position 4. Even though micro-switch 602 remains closed, no further impulse will get to the switch 700 solenoid through that switch because the wiper of the tap switch 701 has now passed to contact 4 (as explained above).

A4

The lugs on cams C5 and C7 (in addition to cam C4 which continues the vacuum) cause contacts 244–5 and 244–7 to close. The closing of 244–7 causes energization of valves 510 and 511 which cause cylinder 100 (FIG. 6) to protract, causing the other stack of labels on plate 82 to move to the dispensing position. The closing of 244–5 causes valves 506 and 507 to energize. Valve 506 closes (rod port, normally open, meaning the valve connected to rod end, and the port open to line pressure when the valve coil is de-energized) while valve 507 opens (rear port, normally closed) thus causing cylinder 110 (FIG. 7) to extend. This moves suction cups 120, and the plate 106, from which they are suspended, and guide rod 104, out and over the compression plate pin 60 (FIG. 8). On reaching that point, a member 603a attached to the end of guide rod 104 closes micro-switch 603 (FIG. 7). This allows a current to pass through 701 tap switch contact 4 and into switch 700 solenoid causing switch 700 to advance to position 5.

A5

In position 5, in addition to those contacts made by rotation of switch 700 to position 4, which are maintained in position 5, contacts 244–6 are closed. This causes valves 508 and 509 to be energized which causes cylinders 114 to protract, causing the suction cups 120 (because of movement of member 118 FIGS. 6 and 7) to to push the label onto pin 60 (FIG. 8). Simultaneously, the closing of contacts 244–6 causes a current to flow to the coil of time delay relay 707 (¼ second time delay). Thus, ¼ second after moving to position 5, relay 707 closes, causing a current to flow through pole 1 of relay 707, through wire 911, into 701 tap switch position 5, which causes step switch 700 to advance to position 6.

A6

The rotation of the cams to position 6 causes de-energization of valves 505, 506, 507, 508, and 509, causing retraction of cylinders 114 (FIG. 6), and closing off to vacuum to suction 120. But in position 6, contacts 244–9 close, causing line current from wire 980 to pass through relay 705, pole 1, to wire 930, causing valves 514 and 515 to energize. This causes cylinder 16 (FIG. 3) to retract (cylinder 16 is normally protracted). The retraction of cylinder 16 causes cup 26 (FIGS. 2 and 3) to move to the right (as viewed in FIGS. 2 and 3) and rotate about pin 20 and dump its contents about pin 60 (FIG. 8). When cup 26 has reached a position above pin 60, member 12 (FIG. 3) has moved to a position to close microswitch 604 (FIG. 3). It should be noted that the current to valves 514 and 515 passes through pole 1 of relay 705. The purpose is that if material is still flowing into cup 301 at the time step switch 700 advances to position 6, then relay 705 will have been de-energized (as will be explained below) thus breaking the current to valves 514 and 515. As soon as the extrusion is completed, relay 705 will be energized allowing the cup contents to be dumped. The extrusion and cup control circuit will be discussed hereinafter under II–B.

A7

The closing of micro-switch 604 (FIG. 3) causes step switch 700 to advance to position 7. Cylinder 16 (FIG. 3) remains retracted; cylinder 100 (FIG. 6) remains extended; valves 503 and 504 are energized as a result of the closing of contacts 244–3, thus causing the left cylinder 8 (FIG. 6) to protract, moving the left label stack toward suction cups 120 (FIGS. 6 and 7); further, the making of contacts 244–10ab switch 700 causes energization of time delay relay 706 (½ second time delay). One-half second after advancing to position 7, switch 700 will be caused to advance to position 8 by the closing of pole 1 of relay 706. Note that during the dwell in position 7, the cup 26 remained in its unload position, and further, the left label stack (FIG. 6) had ½ second to move toward suction cups 120.

A8

The advance to position 8, by switch 700, causes:
(a) Breaking of contacts 244–3, causing retraction of left cylinder 89 (FIG. 6) (because of deenergization of valves 503, 504);
(b) Closing of contacts 244–4, causing energization of valve 505, causing a vacuum to be created in suction cups 120 (FIGS. 6 and 7);
(c) Breaking of contacts 244–9, causing deenergization of valves 514, 515, causing protraction of cylinder 16 (FIG. 3), causing the return of cup 26 to its position in front of extruder nozzle 42 (FIG. 4);
(d) breaking of contacts 244–10, causing de-energization of relay 706 coil, causing reset of that relay.

The retraction of the label stack and the left plate 82 (FIG. 6) causes the closing of micro-switch 605, which allows a current to pass to the solenoid of switch 700, causing switch 700 to advance to position 9.

A9

The advance to position 9, by switch 700 causes:
(a) Continuation of vacuum in suction cups 120 (FIGS. 6 and 7) because contacts 244–4 remain closed;
(b) Closing of contacts 244–5, causing energnization of valves 506, 507, causing protraction of cylinder 110 (FIG. 7);
(c) Breaking of contacts 244–7, causing deenergization of valves 510, 511, causing retraction of cylinder 100 (FIG. 6), causing the right label stack to move into the dispensing position.

Extension of cylinder 110 (FIG. 7), causes the label held by the suction cups 120 to move to a position over pin 60 (onto which one label and a mass of plastic have been delivered); and causes closing of micro-switch 603 by member 603a. This causes a current to pass to the solenoid of switch 700, causing it to advance to position 10.

A10

The advance to position 10, by switch 700, causes:
(a) Continuation of vacuum in suction cups 120 as contacts 244–4 remain closed;
(b) Continuation of protraction of cylinder 110 (FIG. 7) as contacts 244–5 remain closed;
(c) Closing of contacts 244–6, which causes energization of valves 508, 509 causing protraction of cylinders 114 (FIGS. 6 and 7), causing the placing of a second label around pin 60 (FIG. 8);
(d) Closing of contacts 244–6 also caused energization of time delay relay 707 (¼ second).

Thus, ¼ second after arriving at position 10, step switch 700 will be caused to advance to position 11, by a current flowing to the solenoid of switch 700 as a result of the closing of pole 1 contacts on relay 707.

A11

The advance to position 11, by step switch 700, causes:
(a) Breaking of contacts 244–4, causing suction cups 120 (FIGS. 6 and 7) to be opened to atmosphere, thus releasing the label on pin 60 (FIG. 8);
(b) Breaking of contacts 244–5, causing retraction of cylinder 110 (FIG. 7);
(c) Breaking of contacts 244–6, causing retraction of cylinders 114 (FIGS. 6 and 7), and causing reset of relay 707;
(d) Closing of contacts 244–8, causing current to pass by member 136a carried by rack 136 through microswitch 610 (FIG. 11), which is closed when load arm 130 (FIG. 9) is directly over pin 60 and plate 52, and through wire 918 to valves 512, 513 which when energized cause cylinder 68 (FIG. 8) to protract, which causes plate 52 and pin 60 (FIG. 8) to move upward to contact pin 150 (FIG. 10).

On reaching its highest point, plate 52 (FIG. 7) is three-eights of an inch below plate 142 and member 144 which are suspended from arm 130 (FIG. 10). Thus, pin 150, which is fixed relative to arm 130, causes pin 60 and piston 56 (FIG. 8) to recess completely into tube 54, and further, one-eighth of an inch of pin 150 is recessed into the hole in the center of plate 52. Thus, the labels and the plastic, which have now been compressed to a three-eighths inch thickness, are now centered around pin 150. When plate 52 has reached its uppermost point, member 64 (FIG. 8) causes micro-switch 606 to be closed. At this point, all equipment but the press, the unload mechanism, and the extruder are idle until the press opens and the unload mechanism has progressed to a point where switch 750 has advanced to position 6. At that time, a current from power line 904 passes through micro-switch 606, through wire 916, through the now closed contacts 244–10 of switch 750, and into position 11 of tap switch 701, thus causing switch 700 to advance to position 12. (See section III–A6.)

A12

The advance to position 12, by step switch 700 causes:
(a) Breaking of contacts 244–8, causing retraction of cylinder 68 (FIG. 8);
(b) Closing of contacts 244–11, causing the coil of relay 703 to be energized by means of a current which passes from wire 904 through pole 1 (normally-closed) of now de-energized relay 711 and through contacts 244–11.

The energization of relay 703 causes it to "latch in," or remain energized even after contacts 244–11 have been broken by further advance of step switch 700, by means of a current passing from line 904, through relay 711, pole 1 through line 937, through relay 703, pole 1 (normally open), and into the coil of relay 703. Also, current from line 936 passes through relay 703 pole 2, through line 927, to valve 521, causing a vacuum to be created in the holes 140 of member 142, which is a part of the load assembly mechanism at the end of arm 130 (FIG. 10). Thus, the compression of the labels and plastic about pin 150 (FIG. 10), and the effect of the vacuum in the holes of member 142, cause the labels and plastic to adhere to pin 150 and member 142 when plate 52 and pin 60 have descended. On its travel back to a retracted position, member 64 will momentarily close the contacts of micro-switch 607 which will cause the labels and plastic to be loaded into the press. This function will be described in section II–C. Further, the momentary closing of micro-switch 607 will cause a current to flow into step switch 700, causing it to advance to position 13.

A13

The advance to position 13, by step switch 700 causes no change in valve activity. The switch will remain in position 13 until micro-switch 601 is closed by retraction of member 64 (FIG. 8), which causes automatic stepping of switch 700 until position 2 is reached, and the cycle described in sections II–A1 through II–A13 is repeated. The automatic stepping is accomplished by connecting tap switch 701 contacts 13, 14, 15 and 16 to contact 1. It should be noted that the opening of toggle switch 805 at any time during the cycle just described will allow the record in progress to be completed but will prevent the next record from being started. This is to facilitate shutdown of the equipment without causing scrap.

II–B

Operation of extruder and transfer of plastic therefrom to compression plate 52 (FIG. 8) is done as follows:

B1

In section II–A6, it was described how plastic was transferred from cup 26 to the compression plate 52. After that transfer, cup 26 was returned to its position in front of the extruder nozzle 42 (FIG. 4). The cause of these actions was further discussed in sections II–A7 and II–A8c. On protraction to its normally protracted position, when valves 514, 515 are de-energized, cylinder 16 (FIG. 3) causes fixed member 14a to close micro-switch 611 (a one-way switch, meaning that the switch will not close when member 14 is moving in the retract direction), causing a current to flow into a timing device contained in the extruder (merely triggered by micro-switch 611). On the starting of the timer, contacts are closed within the timer which cause an electric clutch to be energized, causing the mechanical energy from a continually running electric motor to be transferred ultimately to a screw, the rotation of which causes plastic to be moved and compressed and eventually pushed through the three orifices in nozzle 42 (FIG. 4). The plastic flows into cup 26 now caused to rotate by means of a friction drive 38 which automatically engages when cup 26 reaches a position in front of nozzle 42 and around post 28, which does not rotate as it is fastened to the inner race of a ball bearing, on the outer race of which is pressed the base of cup 26.

B2

It should be noted that the timer referred to in the previous paragraph has another set of contacts which are open during the timing cycle and closed at all other times. It seems expedient to first explain what occurs when those contacts open (when micro-switch 611 is closed). At the end of the timing cycle, the screw is caused to stop rotating by the opening of the contacts which caused the clutch to be engaged. Further, contacts 6 and 7 of the timer are now closed causing a current to flow from wire 904, through wire 986, through the timer (not shown) contacts 6 and 7, through wire 942, and to the coil of time delay relay 708 (½ second time delay), which closes ½ second after the energization of the coil. Thus, a current is caused to flow through relay 708, pole 1, through wire 944, through relay 709, pole 1, through wire 931, causing energization of valve 516 (½ second after completion of the extruder timer cycle), causing cylinder 48 (FIG. 4) to protract, causing knife 44 to cut the strands of the extrudate. The delay of ½ second is desirable because the screw in the extruder does not stop rotating immediately on completion of the extruder timer cycle. At the same time that the current passes to valve 516, a current passes through wire 943 to the coil of time delay relay 709 (½ second delay); thus, ½ second after energization of valve 516, the closing of relay 709 will cause interruption of that current because of movement of pole 1 of relay 709 to the normally-open side, causing cylinder 48 (a spring return cylinder) to retract. At the same time, the current to valve 516 is interrupted, the pole 2 of relay 709 moves to the normally-open side causing a current to flow through that pole, through wire 941 to the coil of relay 705, causing immediate closing of that relay. Thus, current flowing to the cup motor 40 (by wire 904, relay 705, pole 2, wire 920) is interrupted, causing the cup to stop rotating. Further, a current can now pass through pole 1 of relay 705, thus, when step switch 700 advances to position 6, the contents of cup 26 can be transferred (as described in section II–A6, II–A7). It can be seen that relay 705, and time delay relays 708, 709 will remain energized until the extruder timer is again triggered by the closing of micro-switch 611, causing the de-energization of time delay relay 709, and de-energization of relay 705, the result of which is implied above.

II–C

The loading of the labels and plastic, which is now adhering to pin 342 and member 347 (FIG. 6), will now be described.

C1

As described in section II–A12a and II–12b, cylinder 68 (FIG. 8) is retracting and a vacuum was created in the holes of member 142 (FIG. 10) caused by the energization of the coil of relay 703 which is now "latched in." On further retraction of member 64 (FIG. 8) (as soon as the top of pin 60 has moved downward from pin 150), micro-switch 607 (a one-way switch, closing only on the downward movement of member 64) is closed, causing not only an advance of step switch 700 to position 13, but also a current to flow through a branch of wire 915 to the coil of relay 704, which is caused to "latch in" by means of a current which passes to its coil through wire 904, relay 711, pole 1, wire 937, relay 704, pole 1. Further, the closing of relay 704 allows a current 38 contacts to supply electrical energy until contact 38b1p to pass (by wire 904, relay 704, pole 1, wire 929) to valves 517, 518 causing protraction of cylinder 138 (FIG. 11) which causes arm 130 and the assembly of FIG. 10 to rotate to a position where pin 150 is directly over the pin extending upward from the center of the bottom press die. When that position is reached, member 136a closes micro-switch 608.

C2

The closing of switch 608 allows a current to flow (through 904, relay 711, pole 1, wire 937, now closed relay 703, pole 3, wire 933, micro-switch 608, wire 932) to the coil of time delay relay 710 (¼ second). Thus, ¼ second after energiziation of relay 710, its contacts move to the normally-open position causing:

(a) The current switch had flowed to vacuum valve 521 (through 904, relay 710, pole 2, wire 936, now closed relay 703, pole 2, wire 927) to be interrupted, causing valve 521 to close, thus releasing the vacuum hold on the plastic through holes 140;

(b) A current to flow (by line 904, relay 710, pole 2, wire 928) to valves 519 and 520, the energization of which causes protraction of cylinders 148 (FIG. 10), causing member 144 to push the labels and plastic off pin 150 and away from vacuum holding member 142, and onto the pin extending upward three-eighths of an inch from the center of the bottom press die;

(c) A current to flow (through 904, relay 711, pole 1, wire 937, relay 710, pole 1, wire 945) to the coil of time delay relay 711 (¼ second), causing that relay to close ¼ second after energization of its coil.

C3

The closing of time delay relay 711, ¼ second after energization of its coil, caused the interruption of current flow from wire 904 to wire 937 which causes:

(a) De-energization of relay 703, as wire 937 was supplying current to the coil of 703;

(b) De-energization of time delay relay 704 which causes cylinder 138 and arm 130 (FIG. 11), to retract, causing arm 130 to move toward a position where pin 150 (FIG. 10) will be over pin 60 (FIG. 8);

(c) De-energization of relay 710, as the current to its coil has passed through both wire 937 and the now closed pole 3, of relay 703. Note that the de-energization of relay 710 does not cause vacuum to be recreated in member 142 (FIG. 10) because the current to vacuum valve 521 has been interrupted by the opening of relay 703 pole 2. Further, de-energization of valves 519, 520 is caused because of interruption of current by opening of relay 710, pole 2, causing retraction of cylinders 148 (FIG. 10);

(d) De-energization of relay 711 because current to its coil was supplied by wire 937.

Thus, the load assembly has returned to the state in which it was prior to the protraction of cylinder 68 (FIG. 8).

III–A

A description will now be given of the operation of the unload mechanism and control (FIGS. 11 to 15).

A1

The start position is that in which the step switch 750 is shown. In this position, the cams are in position 1 which causes a current to pass through contacts 254–5 of switch 750, through wire 964, causing energization of valve 553 which causes protraction of cylinder 177, (FIG. 12A), the rod 178 of which passes through the rear of cylinder 178, thus causing partial protraction of cylinder 178, which causes arm 164 (FIG. 12) to rotate 30 degrees causing the lift mechanism, more specifically pin 202 (FIG. 14), to be directly over the unload point I. It should be noted that the same condition is arrived at in position 16 (see III–A13).

This condition is maintained until the record has been pressed and the bottom press die lowers and causes micro-switch 651 (shown only in the circuit diagram) to be closed, causing a current to pass through tap switch 751, causing switch 750 to advance to position 2. It should be noted that the top die of the press does not begin to tilt back until the bottom die has lowered, thus the unload mechanism begins the unload process at the earliest possible time.

A2

The advance to position 2, switch 750 causes:

(a) Closing of contacts 254–2, causing energization of valve 551, causing air to be introduced into the rear port of cylinder 178, causing it to protract until arm 164 rotates to a position G2 90° clockwise from that shown in FIG. 12;

(b) Continuation of protraction of cylinder 177;

(c) Closing of contacts 254–6.

When arm 164 has reached the position described above it closes micro-switch 652 (FIG. 12) causing a current to flow from wire 905, through switch 652, through wire 961, through now closed contacts 254–6, through wire 966, causing energization of valves 555, 556, causing protraction of cylinder 190 (FIGS. 12 and 15) which causes extension of the lift mechanism, suspended from member 186, which is now so located (because of rotation of arm 164 and control imposed by link 166) that its extension will carry pin 202 directly over the pin extending upward from the center of the bottom die. When the protraction is complete, pin 202 will be .020 inch above the pin in the bottom die. Further, a member 184*a* attached to the end of guide rod 184 (FIG. 12) will, when extension is complete, cause micro-switch 653 to be closed, which causes step switch 750 to advance to position 3.

A3

The advance to position 3 causes:

(a) Continuation of protraction of cylinder 428;

(b) Breaking of contacts 254–4, causing the rear port of cylinder 177 to be opened to atmosphere (however it will not retract until cylinder 178 retracts, causing it to retract by means of a force exerted on the front of the rod of cylinder 177 by the rear of the piston of cylinder 178);

(c) Closing of contacts 254–5 causing a vacuum to be created in suction cups 198 (FIG. 14) as a result of energization of vacuum valve 554;

(d) Continuation of protraction of cylinder 178;

(e) Closing of contacts 254–7 causing energization of valve 557, cutting off air to the lower port of cylinder 192 (a spring return cylinder) (FIG. 14), causing suction cups 198 to be lowered (to the position shown in FIG. 14) until the cups contact the record now on the bottom die. Although line vacuum is introduced to cups 198, they are open to atmosphere until they contact the record, thus no substantial vacuum is created in the tubing to the cups until contact with the record is made. When, as a result of contact, substantial vacuum is created, a vacuum diaphragm, attached to the tube running to the cup stems, contracts, causing micro-switch 654 (that is, a vacuum sensitive switch) to be closed, causing switch 750 to advance to position 4.

A4

The advance to position 4 causes:

(a) Continuation of protraction of cylinder 178;

(b) Continuation of vacuum;

(c) Continuation of protraction of cylinder 190;

(d) Breaking of contacts 254–7, causing cylinder 192 to protract, causing the record to be lifted off the bottom die and up against member 200, causing the record to be tilted at a 2½ degree angle.

When the record is lifted up against member 200, the record causes the closing of micro-switch 655, causing step switch 750 to advance to position 5.

A5

The advance to position 5 causes the same conditions to exist as in position 4 except that contacts 6A–6B are broken causing de-energization of valves 555, 556 causing retraction of cylinder 190 (FIG. 12), causing the record to be moved 8 inches toward the front of the press. On retraction of member 186, it causes micro-switch 656 to be closed, causing switch 750 to advance to position 6.

A6

The advance to position 6 causes the same conditions to exist as in position 5 except:

(a) Contacts 254–2 are broken causing de-energization of valve 551, causing the rear port of cylinder 178 to be opened to atmosphere;

(b) Contacts 254–3 are closed causing energization of valve 552, causing the rod end of port of cylinder 178 to be closed to atmosphere and opened to line pressure, causing arm 164 to rotate to the position G shown in FIG. 1.

When arm 163 reaches that position it causes micro-switches 650 and 657 to be closed. The closing of switch 657 causes step switch 750 to advance to position 7. Further contacts 10A–10B are closed allowing a current to pass to tap switch 701, which, if the wiper is in position 11 will cause the load mechanism to load more material into the press (discussed in II–A11). If the load mechanism has not reached that point of progress, it should be noted that contacts 10A–10B will remain closed until switch 750 reaches position 10. Unless the load mechanism has malfunctioned, it will be prepared to load by the time switch 750 reaches position 6. However, if the load mechanism has not begun loading when switch 750 advances to position 10 (reaches a point where, but for the open contacts 254–10, it would advance to position 12), it will not begin to load, and further, when step switch 750 has advanced to position 1, it will not repeat another unload cycle. This will be explained in section IV.

A7

The advance to position 7 causes the same conditions to exist as in position 6 except that contacts 254–6 are closed. Because micro-switch 650 is closed, this allows current to slow to valves 55, 556 to cause protraction of cylinder 190, causing the record to be extended into the edger. When extended, pin 202 is directly above a pin extending up from the bottom plate of the edger. Further, micro-switch 653 is again closed, by the same means as discussed in section III–A2, causing step switch 750 to advance to position 8.

A8

The advance to position 8 causes continuation of the conditions existing in position 7 except:

(a) Contacts 254–5 are broken, ultimately causing cups 198 (FIG. 14) to be opened to atmosphere, allowing the record to drop onto the bottom edger plate;

(b) Contacts 254–11 close causing energization of time delay relay 752 (¼ second).

Thus, the contacts of relay 752 close ¼ second after energization. This allows a current to pass through relay 752, pole 1, to tap switch 751, pole 8, causing step switch 750 to advance to position 9.

A9

The advance to position 9 causes continuation of the same conditions existing in position 8 except:

(a) Contacts 254–6 are broken, causing cylinder 190 to retract which causes the record lift mechanism to be moved from between the edger plates;

(b) Contacts 254–11 open, causing de-energization of relay 752, causing it to reset.

The purpose of the ¼ second dwell of the record lift mechanism over the edger pin is to allow the record to drop far enough away from the lift mechanism so that its retraction would not cause the record to fail to fall on the edger plate pin.

When the lift mechanism is retracted, micro-switch 656 is closed (by the same means as in section III–A5) causing switch 750 to advance to position 10.

A10

The advance to position 10 causes continuation of the conditions existing in position 9 except that contacts 354–8 are closed causing:

(a) Energization of valves 558, 559 causing the edger cylinder to protract, causing the bottom edger plate to be raised up against a driven rotating top plate, which causes the record to rotate relative to the cutting devices, causing the "flash" to be removed and a smooth, rounded edge to be formed on the periphery of the record;

(b) A current to flow into timer 753, which opens contacts connected to P1–P3.

The timer cycle is adjustable, but usually set for about 16 seconds. When the set time elapses, the contacts connected to P1–P3 will close causing step switch 750 to advance to position 11.

A11

The advance to position 11 causes continuation of the conditions existing in position 10 except that contacts 254–8 are opened, causing:

(a) Reset of timer 733;

(b) De-energization of valves 558, 559 causing retraction of the edger cylinder, causing lowering of the lower edger plate.

When the lower edger plate is retracted, it causes micro-switch 658 (not shown) to be closed, causing step switch 750 to advance to position 12.

A12

Except for the position of arm 164, and ultimately the lift mechanism, caused by the retraction of cylinder 178 (FIG. 12), the machine functions in step-switch positions 12, 13, 14, and 15 are the same as those in step switch positions 2, 3, 4, and 5, respectively. Thus, reference is made to sections III–A2 through III–A5.

When cylinder 190 again retracts, when step switch 750 reaches position 15 (as in position 5), member 186 again causes micro-switch 656 to close, causing step switch 750 to advance to position 16.

III–A13

The advance to position 16 causes continuation of the same conditions that existed in position 15 except that contacts 254–3 are opened, causing de-energization of valve 552, causing the rod port of cylinder 178 to be opened to atmosphere. Further, contacts 4A–4B are closed, causing energization of valve 553, causing protraction of cylinder 177, causing arm 164 to rotate 30° clockwise from the position shown in FIG. 8, causing the pin 202 to move directly over a stacking station, from which a ¼ inch diameter rod extends upward to a point 1½ inches below pin 202. When arm 164 rotates 30° from the position shown, it causes micro-switch 659 to close, causing step switch 750 to advance to position 1.

III–A14

The advance to position 1 causes continuation of the conditions existing in position 16 except that contacts 5A–5B are broken causing cups 198 to be open to atmosphere, thus allowing the record to drop onto the finished record stack. The unload mechanism will now await press completion of the next record.

IV

Although the automatic handling mechanism actually cycles at a rate such that the independently controlled press cycle will not be slowed or interrupted, there are several safety controls to prevent damage to the equipment and parts which need to be explained.

IV–A

The control of the press operation is such that, before the press head tilts into the pressing position, a bar, on which a barrier is supported, is raised to a position directly in front of the press. The barrier is so positioned that access to the space between the two dies is prevented. While the barrier is removed on automated presses, the bar remains. The top of the press will not come down as long as the bar is down, or the press will open if the bar is depressed during the press cycle. One safety device utilizes members constructed on the bar which prevent it from raising if either arm 164 or arm 139 are in the unload or load position, respectively. Further, these members on the bar will prevent any part of the load or unload mechanism from interfering with the press operation if the bar is up.

IV–B

The valve which controls the raising of the bar discussed in the previous paragraph is used in conjunction with another safety device. De-energization of that valve will cause lowering of the safety bar. The wire supplying current to that valve passes out of the press and into the control circuit described in sections I, II and III. The wire is connected into the circuit where it comes into contact 9A of step switch 750. It then goes from contact 98, through wire 935, through relay 702, pole 1, and back to the valve. Any interruption of that current will cause the press to open, or, if it is open, will prevent closing of the press.

(1) As can be seen the current is interrupted during positions 2 through 7 of step switch 750. These are the positions during which some of the unload mechanism is inside the press.

(2) When unload arm 387 moves to the unload position during position 2 of step switch 750, it causes closing of micro-switch 660 (one-way switch) which causes a current to flow to the coil of relay 702 (through wire 904, micro-switch 609 (FIG. 7), wire 934, micro-switch 660C, wire 989, switch 815 (a normally-closed button switch)). This causes energization and "latching in" (by means of a current from wire 934 through relay 702, pole 3, to the coil). This relay will remain "latching in," and thus the press can not close until the relay is de-energized. De-energization by the equipment itself can result only from the momentary opening of micro-switch 609 (one-way switch) caused by retraction of member 136. Note that depression of switch 609 causes interruption of the current flowing to the coil of relay 702. Thus, the relay deenergizes and closes the valve circuit, a part of which was relay 702, pole 1.

It should be noted that the current which will allow step switch 750 to advance to position 2 can not get to switch 750 solenoid until relay 702 is de-energized, thus the unload cycle will not repeat until material is loaded into the press. This amounts to a controlled shut-down in the event of a mal-function.

The bottom of the cup 26 constitutes a substantially flat receiving member. 52 is a sandwich-receiving plate. The record engaging member is the part 132. The term "record member" includes both the sandwich and the finished record.

While I have described herein one embodiment of my invention, I wish it to be understood that I do not intend to limit myself thereby except within the scope of the claims hereto or hereinafter appended.

I claim:

1. In a machine for making phonograph records or the like, a substantially flat receiving member, means mounting said receiving member to turn about a substantially vertical axis, means to rotate said member, and means positioned adjacent said member for extruding a stream of fluent material thereonto at a point spaced from the axis of rotation of the receiving member while the same is being rotated, thereby producing an annular body of plastic material, means to apply labels to opposite faces of said annular body, and means for compressing the annular body with the labels thereon to form a phonograph record.

2. In a machine for making phonograph records, means to form an annular body of plastic material, a sandwich-receiving plate, said plate having a pin extending upwardly therefrom centrally thereof, two record-label holding mechanisms adjacent to said plate, means to feed a first label from one of said holding mechanisms on to the upper side of said plate with the hole in the label engaging over the pin and with the label facing downwardly, means for thereafter depositing said annular body of plastic thereon concentric with said pin, and means for thereafter feeding a label from the second label-holding mechanism and placing it with the face upwardly on top of the annular plastic body.

3. In a machine as claimed in claim 2, a frame, said means for forming the annular body comprising a receiving member and a carrier member therefor, means mounting said carrier member on said frame for movement towards and from an extruding means, an arm pivoted on said carrier member, said arm supporting said receiving member, said arm is one extreme position of movement of said carrier member holding said receiving member beneath the outlet of the extruding means, and means operative in the neighborhood of the other extreme position of the carrier member for imparting a swinging motion to said arm in order to invert the receiving member in position above the receiving plate.

4. In a machine as claimed in claim 3, said arm turning means comprising a pinion rigid with said arm and a rack carried by said frame and engageable with said pinion as the carrier member approaches its position remote from the extruding means.

5. In a machine as claimed in claim 2, said label feeding means comprising a head having two downwardly directed suction cups carried thereby, means to create a suction in said cups, means mounting said label-holding means for movement upward towards said suction cups to engage labels against said suction cups, means mounting said head for movement between a position above said label-holding members and a position above said receiving plate, means mounting said head for downward movement with respect to said receiving member to engage a label carried by the head over the pin of the receiving plate, and means for then releasing the suction on said suction cups.

6. In a machine as claimed in claim 5, means mounting said two label-holding means for movement between two positions, in each of which two positions one of the label-holding members is located beneath said suction cups.

7. In a machine as claimed in claim 6, means coordinating the movements of said label-holding means, said label-transfer means and said receiving member to position a label from one of the label-holding means face downwardly on the receiving plate, then to transfer the annular body of fluent plastic from the cup to the receiving plate, then to move the other label-holding member into a position beneath the label feeding means and thereafter to operate the label feeding means to transfer a label from the second stack of labels to said receiving plate.

8. In a machine as claimed in claim 5, each of said label-holding means having an upwardly projecting pin thereon, the upper end of said pin being slightly enlarged and having a roughened peripheral surface.

9. In a machine for making phonograph records, a frame, a carriage mounted on said frame for horizontal sliding movement, an arm pivoted on said carriage to turn about a horizontal axis transverse to the direction of movement of the carriage, a cup rotatably mounted on the end of said arm, extruding means located above the cup in the position occupied by the cup at one end of the movement of the carriage, said extruding means including outlet means located above a portion of the cup spaced outwardly from the axis of rotation thereof when the cup is in such position, means engageable with the cup in such position for rotating the cup, whereby to form an annular body of fluent plastic within the cup, said cup having a central upwardly extending pin, a receiving plate having a central upwardly extending pin and a substantially horizontal top surface, said receiving plate being located on the opposite side of the frame from the extruding means, and means responsive to movement of the carriage towards its other end position, after the cup is withdrawn from beneath the extruding means, to swing said arm upwardly so as to move said cup to an inverted position above said receiving plate with said pins substantially meeting in end-to-end relation, to deposit the annular body of fluent plastic on the receiving member.

10. In a machine as claimed in claim 9, the pin of the receiving plate being mounted for vertical sliding movement with respect thereto, and resilient means normally holding said pin in elevated position projecting above the surface of said receiving plate.

11. In a machine as claimed in claim 9, said extruding means comprising a substantially horizontal cylinder, and said outlet means comprising a plurality of holes arranged in a substantially horizontal line in the face of said extruding means.

12. In a machine as claimed in claim 9, a record engaging member, a press, means mounting said record engaging member for movement between a position above the receiving plate and a position within the press, means for lifting the receiving plate to engage a sandwich held thereon into engagement with the lower face of the record engaging member, the record engaging member having means thereon to hold the sandwich on such lower face.

13. In a machine for making phonograph records or the like, a substantially flat receiving member, means mounting said receiving member to turn about a substantially vertical axis, means to rotate said member, means positioned adjacent said member for extruding a stream of fluent material thereonto at a point spaced from the axis of rotation of the receiving member while the same is being rotated, a sandwich-receiving plate, two record-label holding mechanisms adjacent to said plate, means to feed a first label from one of said holding mechanisms on to the upper side of said plate with the label facing downwardly, means for thereafter moving said receiving member to an inverted position above the receiving plate to deposit an annular body of plastic thereon and means for thereafter re-feeding a label from the second label-holding mechanism and placing it with the face upwardly on top of the annular plastic body, said machine having a press, means mounting said record engaging member for movement between a position above the receiving plate and a position within the press, means for lifting the receiving plate to engage a sandwich held thereon into engagement with the lower face of the record engaging member, the record engaging member having means thereon to hold the sandwich on such lower face, an edger, an arm mounted to turn about a vertical axis, a carrier mounted on said arm, a member mounted on said carrier for horizontal movement in a direction generally towards and from the arm pivot, means connected to the carrier and member to produce such horizontal movement, and means carried by said member for engagement with a finished record, said arm mounting said member for movement between a position within the press and a position above said edger.

14. In a machine as claimed in claim 13, a finished record receiver, said arm also mounting said member for movement to a position above said finished record receiver.

15. In a machine for the manufacture of phonograph records, means to form a sandwich comprising an annular body of fluent plastic material having a central opening therein and having a label on each face thereof, means for partially compressing said sandwich, a press having two record dies, means for transferring the partially compressed sandwich to the press, and means for thereafter compressing the sandwich in the press to final thickness and curing it.

16. In a machine as claimed in claim 15, said partial compressing means comprising a downwardly facing member and means to press the sandwich against said member, said member having a downwardly directed pin on its lower face engageable in the central opening of the sandwich, said pin having a roughened peripheral surface.

17. In a machine as claimed in claim 15, said partial compressing means comprising a downwardly facing member and means to press the sandwich against said member, said member having a downwardly directed pin on its lower face engageable in the central opening of the sandwich, said pressing means comprising a receiving plate on which the sandwich is formed, said member and said plate being mounted for relative movement towards and from each other, said receiving plate having a second pin extending upwardly therefrom aligned with said first pin.

18. In a machine as claimed in claim 17, one of said pins having a recess in its end and the other pin having a pointed end engageable in said recess.

19. In a machine as claimed in claim 17, said second pin being mounted for up and down movement with respect to said receiving plate.

20. In a machine as claimed in claim 16, means associated with said member and moving downwardly around said pin for removing a partially compressed sandwich therefrom.

References Cited
UNITED STATES PATENTS

| | | | |
|---|---|---|---|
| 1,562,331 | 11/1925 | Jamieson | 18—2 |
| 1,861,589 | 7/1932 | Warth. | |
| 2,025,030 | 12/1935 | Ford | 18—2 |
| 2,287,356 | 6/1942 | Newman. | |
| 2,313,750 | 3/1943 | Hothersall. | |
| 2,419,951 | 5/1947 | Kastel. | |
| 2,743,478 | 5/1956 | Harlow et al. | 18—5.3 |
| 2,874,413 | 2/1959 | Grussen. | |
| 3,186,029 | 6/1965 | Joseph | 18—5.3 |
| 3,196,485 | 7/1965 | Battenfeld et al. | 18—5.3 |
| 3,357,043 | 12/1967 | Doucet. | |

WILLIAM J. STEPHENSON, Primary Examiner